US010841084B2

(12) United States Patent
Lee et al.

(10) Patent No.: US 10,841,084 B2
(45) Date of Patent: Nov. 17, 2020

(54) SESSION MANAGEMENT AUTHORIZATION TOKEN

(71) Applicant: QUALCOMM Incorporated, San Diego, CA (US)

(72) Inventors: Soo Bum Lee, San Diego, CA (US); Adrian Edward Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 15/783,260

(22) Filed: Oct. 13, 2017

(65) Prior Publication Data

US 2018/0227302 A1 Aug. 9, 2018

Related U.S. Application Data

(60) Provisional application No. 62/454,685, filed on Feb. 3, 2017.

(51) Int. Cl.
*H04L 29/06* (2006.01)
*H04L 9/08* (2006.01)
(Continued)

(52) U.S. Cl.
CPC ............ *H04L 9/083* (2013.01); *H04L 9/0861* (2013.01); *H04L 9/3234* (2013.01); *H04L 9/3273* (2013.01); *H04L 63/06* (2013.01); *H04L 63/10* (2013.01); *H04L 63/102* (2013.01); *H04W 12/04031* (2019.01); *H04W 12/0609* (2019.01);
(Continued)

(58) Field of Classification Search
CPC ....... H04L 63/10; H04L 63/102; H04L 63/06; H04L 63/062; H04L 63/162; H04L 63/0861; H04L 63/0892; H04L 9/083; H04L 9/3234; H04L 9/3273; H04L 9/0861; H04L 2209/80; H04W 12/08;
(Continued)

(56) References Cited

U.S. PATENT DOCUMENTS

| 8,850,545 B2* | 9/2014 | Cha ........................ H04L 63/168 |
| | | 726/8 |
| 2011/0216743 A1* | 9/2011 | Bachmann ............ H04L 63/164 |
| | | 370/331 |
| 2015/0067328 A1* | 3/2015 | Yin ........................ H04L 9/3236 |
| | | 713/168 |
| 2015/0373523 A1* | 12/2015 | Jeong ....................... H04W 4/24 |
| | | 455/406 |

(Continued)

OTHER PUBLICATIONS

International Search Report and Written Opinion—PCT/US2018/013170—ISA/EPO—dated Mar. 27, 2018.
(Continued)

*Primary Examiner* — Khoi V Le
(74) *Attorney, Agent, or Firm* — Holland & Hart LLP

(57) ABSTRACT

Techniques are described that provide a session management authorization token by receiving a session request message to establish a protocol data unit (PDU) session for a logical data network associated with a user equipment (UE), the session request message may include one or more session parameters; verifying that the UE is authorized to establish the PDU session for the logical data network; receiving a key associated with the PDU session; generating an authorization token based on the received key and the session parameters; and transmitting a session response message including the generated authorization token to the UE.

29 Claims, 20 Drawing Sheets

(51) Int. Cl.
*H04W 48/02* (2009.01)
*H04L 9/32* (2006.01)
*H04W 12/04* (2009.01)
*H04W 12/06* (2009.01)
*H04W 12/08* (2009.01)
*H04W 84/04* (2009.01)

(52) U.S. Cl.
CPC ....... *H04W 12/0802* (2019.01); *H04W 48/02* (2013.01); *H04L 63/062* (2013.01); *H04L 63/0861* (2013.01); *H04L 63/0892* (2013.01); *H04L 63/162* (2013.01); *H04L 2209/80* (2013.01); *H04W 12/0401* (2019.01); *H04W 84/042* (2013.01)

(58) Field of Classification Search
CPC . H04W 12/0401; H04W 12/04; H04W 12/06; H04W 48/02; H04W 84/042
See application file for complete search history.

(56) References Cited

U.S. PATENT DOCUMENTS

| | | | |
|---|---|---|---|
| 2016/0127896 A1* | 5/2016 | Lee | H04W 12/06 455/411 |
| 2017/0171187 A1* | 6/2017 | Yin | H04L 9/3242 |
| 2018/0062847 A1* | 3/2018 | Mildh | H04W 12/10 |

OTHER PUBLICATIONS

"3rd Generation Partnership Project; Technical Specification Group Services System Aspects; Study on the security aspects of the next generation system, (Release 14)" 3GPP Standard, 3GPP TR 33.899, 3rd Generation Partnership Project (3GPP), Mobile Competence Centre, 650, Route Des Lucioles, F-06921, Sophia-Antipolls Cedex, France, vol. SA WG3, No. V0.6.0, XP051229844, Nov. 25, 2016 (Nov. 25, 2016), pp. 1-375.

* cited by examiner

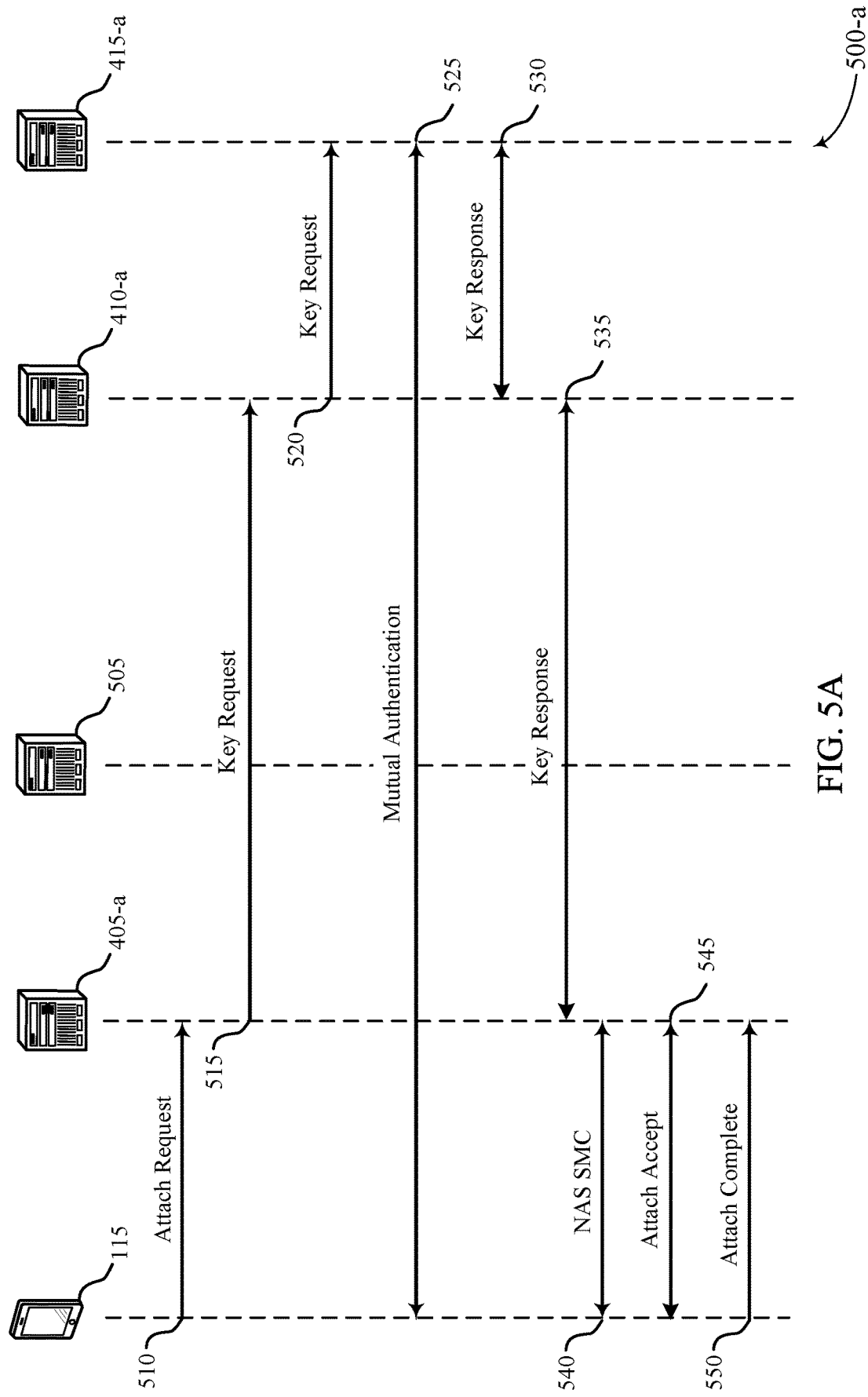

SESSION MANAGEMENT AUTHORIZATION TOKEN

CROSS REFERENCES

The present Application for Patent claims priority to U.S. Provisional Patent Application No. 62/454,685 by Lee, et al., entitled "Session Management Authorization Token," filed Feb. 3, 2017, assigned to the assignee hereof.

BACKGROUND

The following relates generally to wireless communication, and more specifically to session management authorization token.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A wireless multiple-access communication system may include a number of network access devices, each simultaneously supporting communication for multiple communication devices, otherwise known as UEs. In a LTE or LTE-Advanced (LTE-A) network, a network access device may take the form of a base station, with a set of one or more base stations defining an eNodeB (eNB). In a next generation NR system, millimeter wave (mmW), or 5G network, a network access device may take the form of a smart radio head (or radio head (RH)) or access node controller (ANC), with a set of smart radio heads in communication with an ANC defining a next generation NodeB (gNB). A network access device may communicate with a set of UEs on downlink channels (e.g., for transmissions from a network access device to a UE) and uplink channels (e.g., for transmissions from a UE to a network access device).

A UE may request a network device to establish a session related to a subscription provided by the network device. In some wireless communications systems, such as LTE or LTE-A, a mobility management entity (MME) may handle authentication, authorization, and session management. As a result, the MME may perform both a mobility management function and a session management function related to establishing a session. The MME may be responsible for the session creation that the UE attempts to establish. However, in the next generation, NR, mmW, or 5G network, authentication, authorization, and session management may not be supported or handled by a single network device (i.e., the MME).

SUMMARY

The described techniques relate to improved methods, systems, devices, or apparatuses that support session management. A user equipment (UE) may establish a protocol data unit (PDU) session for a logical data network. The logical data network may also be referred to as a network slice. In some aspects, a network slice related to the PDU session may need authorization, prior to establishing the PDU session for the UE. In wireless communications systems, such as LTE or LTE-A, the MME may handle both the mobility management and session management for UEs requesting to establish a session. By contrast, in the next generation, NR, mmW, or 5G network, mobility management and session management function may be at least logically separated from the MME and be positioned at different locations. In the next generation, NR, mmW, or 5G network—session management may be performed by a session management function (SMF), which may be a logically separate function from an access and mobility management function (AMF).

A method of wireless communication is described. The method may include receiving a session request message to establish a PDU session for a logical data network associated with a UE, the session request message comprising session parameters, verifying that the UE is authorized to establish the PDU session for the logical data network, receiving a key associated with the PDU session based at least in part on the verifying, generating an authorization token based at least in part on the received key and the session parameters, and transmitting a session response message comprising the generated authorization token to the UE.

An apparatus for wireless communication is described. The apparatus may include means for receiving a session request message to establish a PDU session for a logical data network associated with a UE, the session request message comprising session parameters, means for verifying that the UE is authorized to establish the PDU session for the logical data network, means for receiving a key associated with the PDU session based at least in part on the verifying, means for generating an authorization token based at least in part on the received key and the session parameters, and means for transmitting a session response message comprising the generated authorization token to the UE.

Another apparatus for wireless communication is described. The apparatus may include a processor, memory in electronic communication with the processor, and instructions stored in the memory. The instructions may be operable to cause the processor to receive a session request message to establish a PDU session for a logical data network associated with a UE, the session request message comprising session parameters, verify that the UE is authorized to establish the PDU session for the logical data network, receive a key associated with the PDU session based at least in part on the verifying, generate an authorization token based at least in part on the received key and the session parameters, and transmit a session response message comprising the generated authorization token to the UE.

A non-transitory computer readable medium for wireless communication is described. The non-transitory computer-readable medium may include instructions operable to cause a processor to receive a session request message to establish a PDU session for a logical data network associated with a UE, the session request message comprising session parameters, verify that the UE is authorized to establish the PDU session for the logical data network, receive a key associated with the PDU session based at least in part on the verifying, generate an authorization token based at least in part on the received key and the session parameters, and transmit a session response message comprising the generated authorization token to the UE.

In some examples of the method, apparatus, and non-transitory computer-readable medium described above, the receiving the key comprises receiving the key from a security anchor function (SEAF), wherein the SEAF may be a network function maintaining an authentication anchor key derived based at least in part on a successful authentication of the UE to a network. In some examples of the method, apparatus, and non-transitory computer-readable medium described above, the receiving the key comprises receiving the key from a third-party authentication, authorization, and accounting (AAA) server based at least in part on an extensible authentication protocol (EAP).

Some examples of the method, apparatus, and non-transitory computer-readable medium described above may further include processes, features, means, or instructions for transmitting a key request message comprising an identifier (ID) of the UE and an ID of the logical data network. Some examples of the method, apparatus, and non-transitory computer-readable medium described above may further include processes, features, means, or instructions for receiving a key response message in response to the key request message, the key response message comprising a session management function (SMF) key. Some examples of the method, apparatus, and non-transitory computer-readable medium described above may further include processes, features, means, or instructions for receiving the key response message from a SEAF.

Some examples of the method, apparatus, and non-transitory computer-readable medium described above may further include processes, features, means, or instructions for receiving the SMF key in the key response message, wherein the SMF key may be derived based at least in part on a SEAF key associated with the SEAF. Some examples of the method, apparatus, and non-transitory computer-readable medium described above may further include processes, features, means, or instructions for integrity protecting the session response message based at least in part on the SEAF key. In some examples of the method, apparatus, and non-transitory computer-readable medium described above, the session parameters comprises at least one of a security algorithm, a quality-of-service (QoS), or a combination thereof.

Some examples of the method, apparatus, and non-transitory computer-readable medium described above may further include processes, features, means, or instructions for obtaining session parameters requested by the UE. Some examples of the method, apparatus, and non-transitory computer-readable medium described above may further include processes, features, means, or instructions for determining session parameters based at least in part on a UE subscription profile, a logical data network policy, a third-party authorization, or any combination thereof. Some examples of the method, apparatus, and non-transitory computer-readable medium described above may further include processes, features, means, or instructions for determining a session policy for the PDU session based at least in part on the determining. Some examples of the method, apparatus, and non-transitory computer-readable medium described above may further include processes, features, means, or instructions for transmitting the session policy in the session response message to the UE.

In some examples of the method, apparatus, and non-transitory computer-readable medium described above, the session request message comprises at least one of a logical network ID, a UE ID, or a combination thereof.

Some examples of the method, apparatus, and non-transitory computer-readable medium described above may further include processes, features, means, or instructions for generating the authorization token based at least in part on a message authentication code (MAC) function, wherein the SMF key and the session parameters may be inputs to the MAC function. In some examples of the method, apparatus, and non-transitory computer-readable medium described above, the session request message may be an integrity protected session request message based at least in part on a shared key between the UE and an AMF.

Some examples of the method, apparatus, and non-transitory computer-readable medium described above may further include processes, features, means, or instructions for delivering authentication message exchanges between the UE and an AAA server over a session management (SM) non-access stratum (NAS) connection between the UE and a SMF, and over an SM NAS connection between the SMF and the AAA server. Some examples of the method, apparatus, and non-transitory computer-readable medium described above may further include processes, features, means, or instructions for receiving an indication from the AAA server whether the UE may be authorized to establish the PDU session for the logical data network in response to the authentication message exchanges.

In some examples of the method, apparatus, and non-transitory computer-readable medium described above, the receiving the key response message may be based at least in part on the indication that the UE may be authorized to establish the PDU session. In some examples of the method, apparatus, and non-transitory computer-readable medium described above, the SMF key may be derived by the AAA server.

Some examples of the method, apparatus, and non-transitory computer-readable medium described above may further include processes, features, means, or instructions for receiving a master session key from the third-party server based at least in part on the authentication protocol indicating that the UE may be authorized to establish the PDU session. Some examples of the method, apparatus, and non-transitory computer-readable medium described above may further include processes, features, means, or instructions for deriving the SMF key based at least in part on the master session key.

Some examples of the method, apparatus, and non-transitory computer-readable medium described above may further include processes, features, means, or instructions for transmitting an SM NAS security mode command to the UE, wherein the SM NAS security mode command comprises at least one of a selected security algorithm, a session policy for the PDU session, or a combination thereof.

In some examples of the method, apparatus, and non-transitory computer-readable medium described above, the generating the authorization token may be based at least in part on a hash of at least one of a selected security algorithm, a session policy for the PDU session, or the combination thereof. In some examples of the method, apparatus, and non-transitory computer-readable medium described above, the session request message may be received at an SMF. In some examples of the method, apparatus, and non-transitory computer-readable medium described above, the generated authorization token comprises an indication as to whether the PDU session for the logical data network may be authorized by the SMF.

In some examples of the method, apparatus, and non-transitory computer-readable medium described above, the SMF may be located at a serving network or a home network. In some examples of the method, apparatus, and non-transitory computer-readable medium described above, the serving network comprise a Visited Public Land Mobile Network (VPLMN). In some examples of the method, apparatus, and non-transitory computer-readable medium described above, the home network comprise a Home Public Land Mobile Network (HPLMN). In some examples of the method, apparatus, and non-transitory computer-readable medium described above, the logical data network may be associated with a network slice.

Some examples of the method, apparatus, and non-transitory computer-readable medium described above may further include processes, features, means, or instructions for receiving a session response acknowledgment message from the UE; and verifying the UE based at least in part on the session response acknowledgment message.

A method of wireless communication is described. The method may include transmitting a session request message to establish a PDU session for a logical data network, the session request message comprising session parameters and receiving a session response message comprising an authorization token that is based at least in part on a SMF key and the session parameters.

An apparatus for wireless communication is described. The apparatus may include means for transmitting a session request message to establish a PDU session for a logical data network, the session request message comprising session parameters and means for receiving a session response message comprising an authorization token that is based at least in part on a SMF key and the session parameters.

Another apparatus for wireless communication is described. The apparatus may include a processor, memory in electronic communication with the processor, and instructions stored in the memory. The instructions may be operable to cause the processor to transmit a session request message to establish a PDU session for a logical data network, the session request message comprising session parameters and receive a session response message comprising an authorization token that is based at least in part on a SMF key and the session parameters.

A non-transitory computer readable medium for wireless communication is described. The non-transitory computer-readable medium may include instructions operable to cause a processor to transmit a session request message to establish a PDU session for a logical data network, the session request message comprising session parameters and receive a session response message comprising an authorization token that is based at least in part on a SMF key and the session parameters.

Some examples of the method, apparatus, and non-transitory computer-readable medium described above may further include processes, features, means, or instructions for integrity protecting the session request message based at least in part on a SMF key derived from an authentication anchor key maintained by a SEAF. In some examples of the method, apparatus, and non-transitory computer-readable medium described above, the session request message comprises at least one of a security algorithm, a QoS, or a combination thereof. Some examples of the method, apparatus, and non-transitory computer-readable medium described above may further include processes, features, means, or instructions for receiving a session policy for the PDU session, the session policy may be associated with at least one of a logical network ID, a UE ID, or a combination thereof.

Some examples of the method, apparatus, and non-transitory computer-readable medium described above may further include processes, features, means, or instructions for receiving a SM NAS security mode command, wherein the SM NAS security mode command comprises at least one of a selected security algorithm, a session policy for the PDU session, or a combination thereof. Some examples of the method, apparatus, and non-transitory computer-readable medium described above may further include processes, features, means, or instructions for verifying the SM NAS security mode command based at least in part on the transmitted session request message. Some examples of the method, apparatus, and non-transitory computer-readable medium described above may further include processes, features, means, or instructions for transmitting a SM NAS security mode complete message based at least in part on the verifying. Some examples of the method, apparatus, and non-transitory computer-readable medium described above may further include processes, features, means, or instructions for generating a session response acknowledgment message; and transmitting the session response acknowledgment message to a SMF.

BRIEF DESCRIPTION OF THE DRAWINGS

FIGS. 5A and 5B illustrates an example of a process flow that supports session management authorization token in accordance with aspects of the present disclosure.

DETAILED DESCRIPTION

Figure 1:
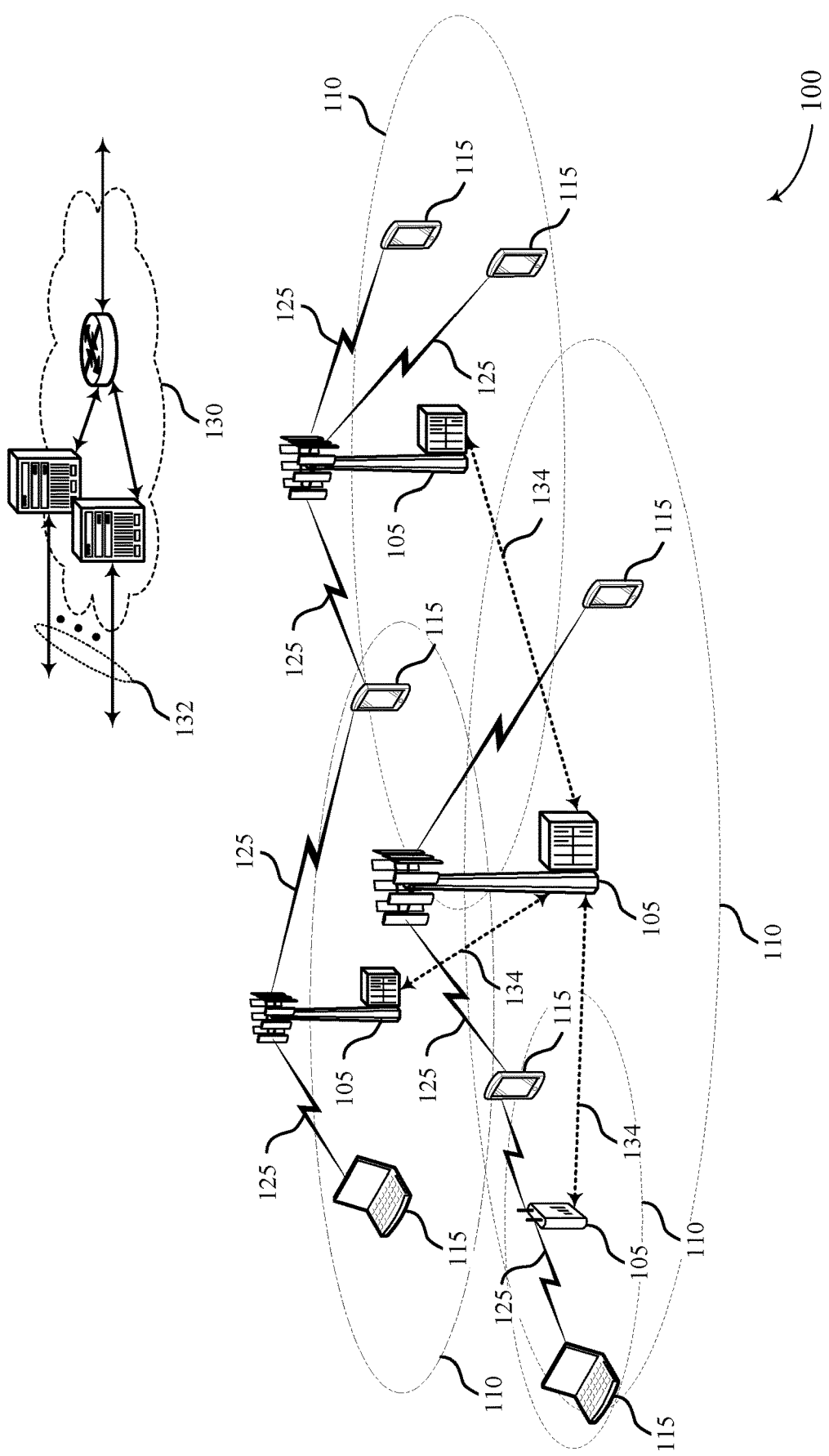
FIG. 1 illustrates an example of a wireless communication system for wireless communication that supports session management authorization token in accordance with aspects of the present disclosure.

A user equipment (UE) may establish a protocol data unit (PDU) session for a logical data network. The logical data network may also be referred to as a network slice. In some aspects, a network slice related to the PDU session may need authorization before establishing the PDU session for the UE. A mobility management entity (MME) in some examples, may handle both the mobility management and session management for UEs requesting to establish a session. In the next generation, NR, mmW, or 5G network, mobility management and session management function may be separated from the MME and be positioned at different locations. In the next generation, NR, mmW, or 5G network—session management may be performed by a session management function (SMF), which may be a logically separate function compared to an access and mobility function (AMF). The AMF may also be located in a different security domain compared to the SMF. For instance, the AMF may be located closer to the UE (or radio access network (RAN)) in a serving network, while the SMF may be located deeper in the network. In this aspect, the AMF may be at a less secure location in the network. As a result, the AMF may be more prone to be compromised and perform unauthorized behaviors. For example, the compromised AMF may modify session information requested by a UE. Additionally, the AMF may modify session information authorized by an SMF. In some examples, the AMF may be part of a Visited Public Land Mobile Network (VPLMN). Alternatively, the SMF may be part of a Home Public Land Mobile Network (HPLMN).

The SMF may, in some aspects, interface with a policy control function (PCF) that may include subscription information on one or more services associated with a network slice and/or UE. The SMF may also interface with a third-party authentication, authorization, and accounting (AAA) server (e.g., that may authorize sponsored zero-rated sessions). The SMF, in some examples, may authorize the PDU session for the network slice based on a subscription of the UE. The AMF may service one or more network slices (i.e., logical data networks). A network slice PDU session creation may in some aspects be authorized by the SMF based on service or network slice subscription information that may not be accessible by the AMF. In some examples, the SMF may derive an authorization token based on a security key known only to the UE and SMF, to protect information (e.g., data packets, configuration information, subscription information, signaling between the UE and SMF, etc.) from being compromised at the AMF (e.g., altered, deciphered, or injected by the AMF).

In some examples, each network slice may be associated with a different session authorization policy based on the subscription of the UE. For example, a UE may request to establish a subscription with an eMBB slice, Internet of Things (IoT) slice, or a mission critical slice. The AMF may apply a different session authorization policy on a PDU session associated with each of the subscriptions based on one or more subscription demands (e.g., security needs such as encryption and integrity protection algorithms, and security termination points). Alternatively, each slice may be related to a different session authorization policy based on an additional authentication or authorization of a third-party AAA server that enforces session policies.

Aspects of the disclosure are initially described in the context of a wireless communications system. Exemplary wireless devices (e.g., UEs or network entities), systems, and process flows for session management authorization token are then described. Aspects of the disclosure are further illustrated by and described with reference to apparatus diagrams, system diagrams, and flowcharts that relate to session management authorization token.

FIG. 1 illustrates an example of a wireless communication system 100 for wireless communication that supports session management authorization token in accordance with aspects of the present disclosure. The wireless communication system 100 includes network devices 105, UEs 115, and a core network 130. In some examples, the wireless communication system 100 may be a 5th Generation (5G)/New Radio (NR) or long-term evolution (LTE) (or LTE-Advanced) network. In some aspects, wireless communication system 100 may support enhanced broadband communications, ultra-reliable (i.e., mission critical) communications, low latency communications, and communications with low-cost and low-complexity devices.

Wireless communication system 100 may support wireless device 105 generating an authorization token for a session management associated with UE 115. Network device 105 may receive a session request message from UE 115 to establish a session for a logical data network. The session request message may include one or more session parameters. In some aspects, network device 105 may verify that UE 115 is authorized to establish the session for the logical data network. Network device 105 may also receive a key associated with the session in response to verifying the UE 115. In some examples, network device 105 may generate an authorization token based on the received key and at least one session parameter received in the session request message from UE 115. Network device 105 may transmit a session response message to UE 115. The session response message may include the generated authorization token. By verifying the authorization token, UE 115 can be assured that network device 105 is authorized to serve UE 115.

Network devices 105 may wirelessly communicate with UEs 115 via one or more base station antennas. Each network device 105 may provide communication coverage for a respective geographic coverage area 110. Communication links 125 shown in wireless communication system 100 may include uplink (UL) transmissions from a UE 115 to a network device 105, or downlink (DL) transmissions, from a network device 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UE 115 may be configured to transmit a session request message to network device 105, to establish a session for a logical data network. In some examples, UE 115 may be configured to receive a session response message from network device 105. The session response message may include an authorization toke that is based on a key and a session parameter. The UE 115 may also be configured to integrity protecting the session request message using a key (e.g., SMF key) derived from an authentication anchor key associated with UE 115.

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, IoT device, an Internet of Everything (IoE) device, a machine type communication (MTC) device, an appliance, an automobile, or the like.

In some aspects, a UE 115 may also be able to communicate directly with other UEs (e.g., using a peer-to-peer (P2P) or device-to-device (D2D) protocol). One or more of a group of UEs 115 utilizing D2D communications may be within the geographic coverage area 110 of a cell. Other UEs 115 in such a group may be outside the geographic coverage area 110 of a cell, or otherwise unable to receive transmissions from a network device 105. In some aspects, groups of UEs 115 communicating via D2D communications may utilize a one-to-many (1:M) system in that each UE 115 transmits to every other UE 115 in the group. In some aspects, a network device 105 facilitates the scheduling of resources for D2D communications. In other aspects, D2D communications are carried out independent of a network device.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some aspects, an MTC device may operate using half-duplex (one-way) communications at a reduced peak rate. MTC devices may also be configured to enter a power saving "deep sleep" mode when not engaging in active communications. In some aspects, MTC or IoT devices may be designed to support mission critical functions and wireless communications system may be configured to provide ultra-reliable communications for these functions.

Network devices 105 may communicate with the core network 130 and with one another. For example, network devices 105 may interface with the core network 130 through backhaul links 132 (e.g., S1, etc.). Network devices 105 may communicate with one another over backhaul links 134 (e.g., X2, etc.) either directly or indirectly (e.g., through core network 130). Network devices 105 may perform radio configuration and scheduling for communication with UEs 115, or may operate under the control of a base station controller (not shown). In some examples, network devices 105 may be macro cells, small cells, hot spots, or the like. network devices 105 may also be referred to as eNodeBs (eNBs) 105.

A network device 105 may be connected by an S1 interface to the core network 130. The core network may be an evolved packet core (EPC), which may include at least one MME, at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices, such as network device 105 may include subcomponents such as an access network device, which may be an example of an access node controller (ANC). Each access network device may communicate with a number of UEs through a number of other access network transmission entities, each of which may be an example of a smart radio head, or a transmission/reception point (TRP). In some configurations, various functions of each access network device or network device 105 may be distributed across various network devices (e.g., radio heads and access network controllers) or consolidated into a single network device (e.g., a network device 105).

Wireless communication system 100 may operate in an ultra-high frequency (UHF) frequency region using frequency bands from 700 MHz to 2600 MHz (2.6 GHz), although in some aspects of wireless communication system 100 may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some aspects, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some aspects, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and network devices 105. Devices operating in mmW or EHF bands may have multiple antennas to allow beamforming. That is, a network device 105 may use multiple antennas or antenna arrays to conduct beamforming operations for directional communications with a UE 115. Beamforming (that may also be referred to as spatial filtering or directional transmission) is a signal processing technique that may be used at a transmitter (e.g. a UE 115) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g. a base station) and a receiver (e.g. a UE), where both transmitter and receiver are equipped with multiple antennas. Some portions of wireless communication system 100 may use beamforming. For example, network device 105 may have an antenna array with a number of rows and columns of antenna ports that the network device 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some aspects, the antennas of a network device 105 or UE 115 may be located within one or more antenna arrays, which may support beamforming or MIMO operation. One or more base station antennas or antenna arrays may be collocated at an antenna assembly, such as an antenna tower. In some aspects, antennas or antenna arrays associated with a network device 105 may be located in diverse geographic locations. A network device 105 may multiple use antennas or antenna arrays to conduct beamforming operations for directional communications with a UE 115.

In some aspects, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some aspects perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device 105 or core network 130 supporting radio bearers for user plane data. At the Physical (PHY) layer, transport channels may be mapped to physical channels.

Time intervals in LTE or NR may be expressed in multiples of a basic time unit (that may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some aspects the subframe may be the smallest scheduling unit, also known as a TTI. In other aspects, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communication system 100 may support operation on multiple cells or carriers, a feature that may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some aspects, wireless communication system 100 may utilize enhanced component carriers (eCCs). An eCC may be characterized by one or more features including: wider bandwidth, shorter symbol duration, shorter transmission time interval (TTIs), and modified control channel configuration. In some aspects, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some aspects, an eCC may utilize a different symbol duration than other CCs, which may include use of a reduced symbol duration as compared with symbol durations of another CCs. A shorter symbol duration may be associated with increased subcarrier spacing. A TTI in an eCC may consist of one or multiple symbols. In some aspects, the TTI duration (that is, the number of symbols in a TTI) may be variable. In some aspects, an eCC may utilize a different symbol duration than other CCs, which may include use of a reduced symbol duration as compared with symbol durations of another CCs. A shorter symbol duration is associated with increased subcarrier spacing. A device, such as a UE 115 or network device 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some aspects, the TTI duration (that is, the number of symbols in a TTI) may be variable.

In some aspects, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as network devices 105 and UEs 115 may employ listen-before-talk (LBT) procedures to ensure the channel is clear before transmitting data. In some aspects, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Figure 2:
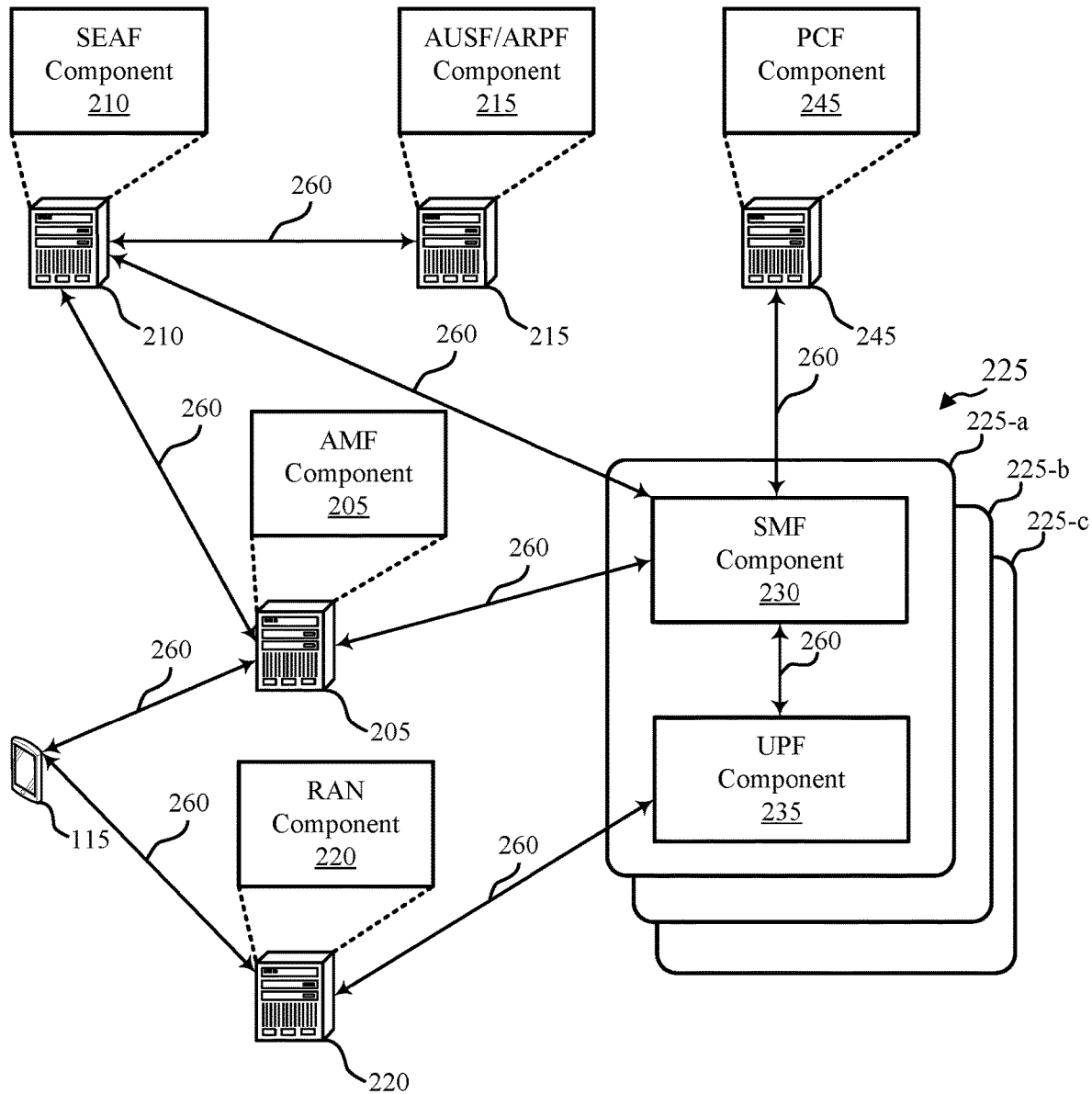
FIG. 2 illustrates an example of a wireless communication system for wireless communication that supports session management authorization token in accordance with aspects of the present disclosure.

FIG. 2 illustrates an example of a wireless communication system 200 for wireless communication that supports session management authorization token in accordance with aspects of the present disclosure. The wireless communication system 200 may include a UE 115, that may be examples of UE 115 as described herein with reference to FIG. 1. The wireless communication system 200 may also include a AMF component 205, a security anchor function (SEAF) component 210, an authentication server function/authentication credential repository and processing function (AUSF/ARPF) component 215, a RAN component 220, a group of logical data networks (i.e., network slices) 225, and a PCF component 245.

In some examples, the group of logical data networks 225 may include a first logical data network 225-a, a second logical data network 225-b, and a third logical data network 225-c. The group of logical data networks 225 may additionally include an SMF component 230 and a user plane function (UPF) component 235. Communication links 260 shown in wireless communication system 200 may include uplink (UL) transmissions from UE 115 to one or more network entities (e.g., AMF component 205, SEAF component 210, AUSF/ARPF component 215, RAN component 220, group of logical data networks 225, and PCF component 245), or downlink (DL) transmissions, from one or more of the network entities (e.g., AMF component 205, SEAF component 210, AUSF/ARPF component 215, RAN component 220, group of logical data networks 225, and PCF component 245) to UE 115.

UE 115 may transmit a session request message to establish a session with one or more logical data networks of the group of logical data networks 225. In some examples, the session may be a PDU session with one or more of the logical data networks 225. In some aspects, UE 115 and SMF component 230 may establish a session management (SM) non-access stratum (NAS) security connection, and the UE 115 may transmit the session request message over the established SM NAS security connection. UE 115 may, additionally, integrity protect the session request message. In some examples, the SMF component 230 may verify the integrity protected session request message based on a SMF key (i.e., a data network session key or slice key associated with the SMF) obtained from SEAF component 210 of the network. The SEAF component 210 may hold an authentication anchor key i.e., SEAF key, and derive an SMF key for the SMF component 230 (or the data network or slice). For example, UE 115 may derive a SMF key to protect the session request message using a SEAF key (i.e., authentication anchor key associated with the UE 115). The SEAF key, in some aspects, may not be available to the AMF component 205.

SEAF component 210 may also derive the SMF key based on a location of the SMF component 230. Additionally, SEAF component 210 may derive the SMF key based on the location of the SMF component 230, a logical data network type or ID (e.g., associated with at least one of the first logical data network 225-a, the second logical data network 225-b, and/or the third logical data network 225-c.). In some aspects, the SMF component 230 may be located in at least one of a VPLMN or HPLMN.

SMF component 230 in communication with UPF component 235 via communication links 260, and PCF component 245 and AUSF/ARPF component 215 may verify that the UE 115 is authorized to establish the PDU session for a corresponding logical data network (e.g., at least one logical data network slice from the group of logical data networks 225). In some examples, the SMF component 230 may transmit an integrity protected session response message to UE 115. The integrity protected session response message may be in some examples, verified by the UE 115. SMF component 230 may obtain a SMF key from the SEAF component 210. SEAF component 210 may maintain the SEAF key that is derived based on the verification (i.e., authentication) of the UE 115. The SEAF key may in some examples, be derived at the UE 115.

In some examples, SMF component 230 may obtain session parameters or indication of services requested (e.g., establish a subscription with an eMBB slice, IoT slice, or a mission critical slice) by UE 115. SMF component 230 may determine the session parameters based on a UE 115 subscription profile, a logical data network policy, a third-party authorization, or any combination thereof. PCF component 245 may store the UE 115 subscription profile. As a result, PCF component 245 may provide the UE 115 subscription profile associated with the data network or the service session to SMF component 230. In some aspects, SMF component 230 may determine a session policy for the requested session based on at least one of the UE 115 subscription profile, a logical data network policy, a third-party authorization, or any combination thereof. SMF component 230 may transmit the session policy in a session response message to UE 115.

SMF component 230 may also transmit a key request message to SEAF component 210. The key request message may include an ID of UE 115 and an ID of at least one of the logical data networks 225. SEAF component 210 may transmit the key request message to the AUSF/ARPF component 215. The AUSF/ARPF component 215 may authenticate the UE 115. AUSF/ARPF component 215 may transmit a key response message in response to the key request message and the authentication of UE 115 to SEAF component 210. The key response message may include a SEAF key. AUSF/ARPF component 215 may derive the SEAF key. In some examples, the SMF key may be derived based on the SEAF key. In some examples, UE 115 may independently derive a SEAF key and an SMF key based on the SEAF key.

SMF component 230 may generate an authorization token using the SMF key. In some examples, SMF component 230 may generate the authorization token based on a session request parameter. The session request parameter may be transmitted and be part of the session request message. A session request parameter may include a security algorithm, a QoS, logical data network ID, etc. The SMF component 230 may generate the authorization token using a MAC generation function (e.g., HMAC-SHA-256/512, HMAC-SHA-3, CMAC, GMAC). The SMF key and one or more of the session parameter may be inputs to the MAC generation function. Alternatively, in some aspects an input parameter to the MAC generation function may be an indication of no security, i.e., the input parameter to the MAC generation function would only be the SMF key and a text string, e.g., "no security". In some examples, the text string may be empty.

SMF component 230 may, additionally, generate the authorization token based on the SMF key and one or more additional session parameters. For example, SMF component 230 may generate the authorization token based on the SMF key, a session request parameter, logical data network ID, an SMF ID, a session counter, a session management message counter, a hash of the at least one of the selected security algorithms, a hash of the at least one of the session request parameters, session policy for the PDU session, or a combination thereof. In some aspects, the session counter may be associated with a number of session that UE 115 has requested since joining a network.

In some aspects, SEAF component 210 may monitor and track the number of sessions that UE 115 has requested since joining the network. The session management message counter may be a counter to prevent replay attacks on the session request message (i.e., session creation request message) transmitted by UE 115, or replay attacks on the session response message (i.e., session creation response message) transmitted by the SMF component 230, or both. SMF component 230 may transmit a session response message including the generated authorization token to the UE 115, via AMF component 205.

Figure 3A:
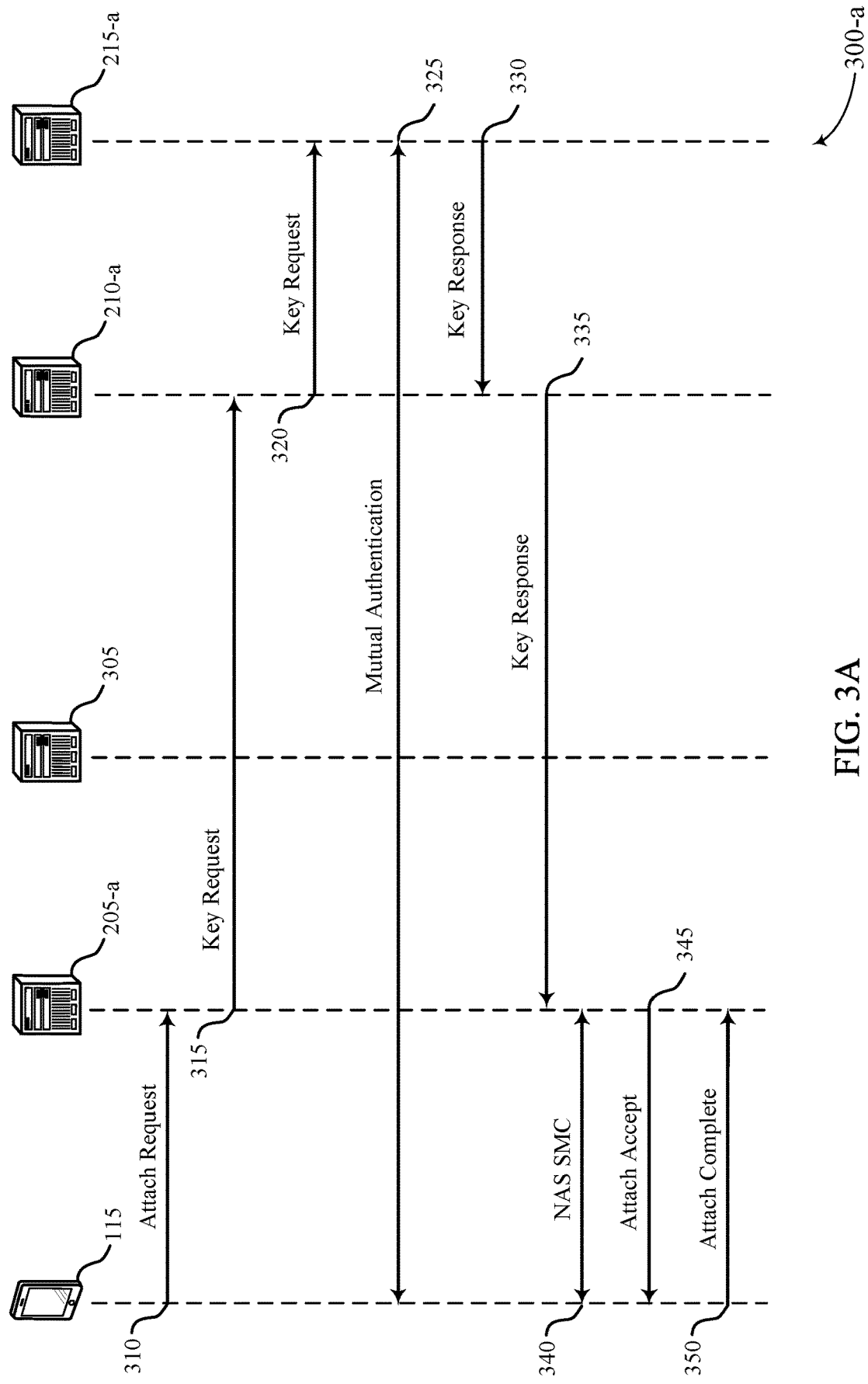
FIGS. 3A and 3B illustrate an example of a process flow that supports session management authorization token in accordance with aspects of the present disclosure.
Figure 3B:
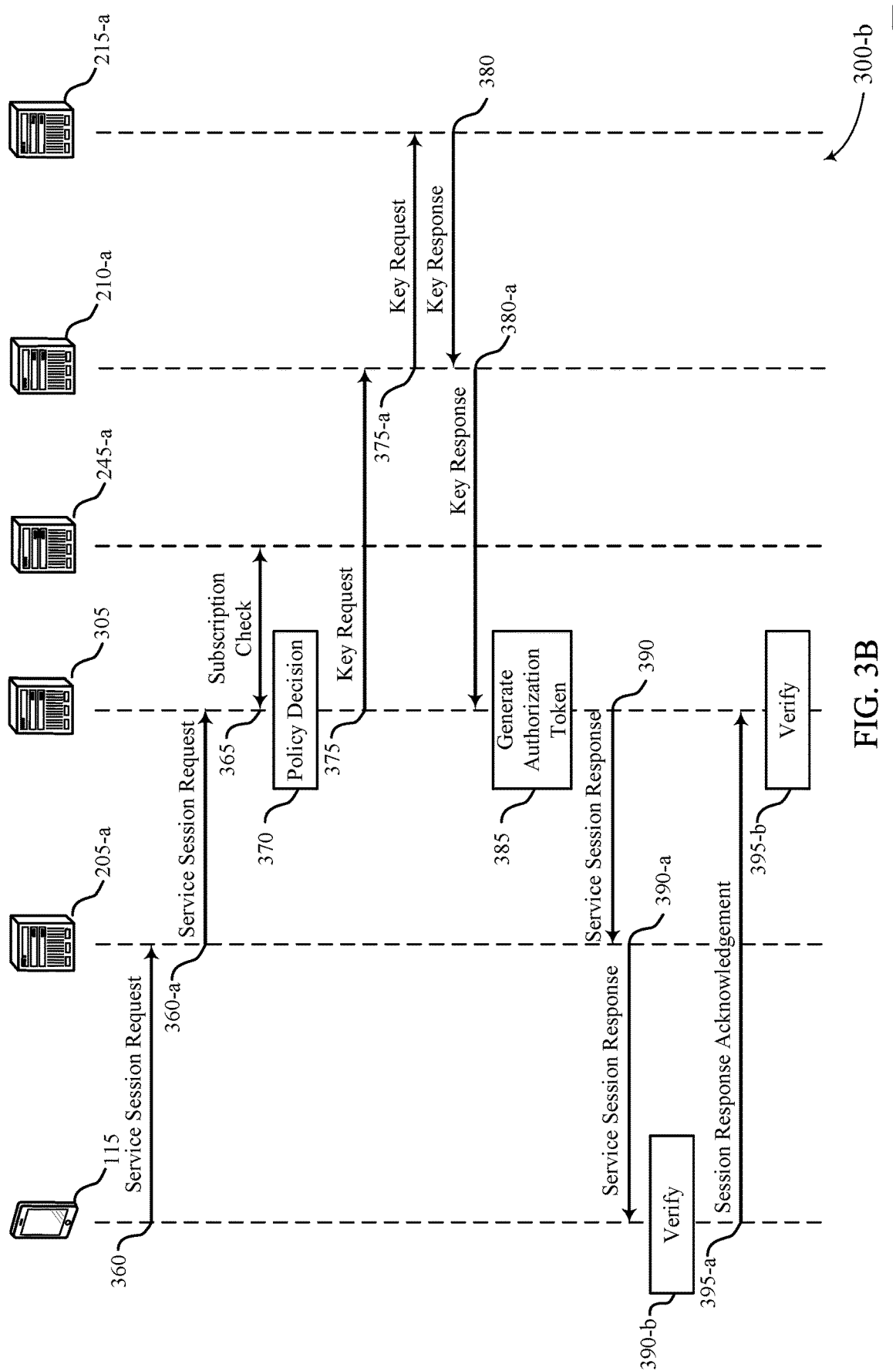

FIGS. 3A and 3B illustrate an example of a process flow 300 that supports session management authorization token in accordance with aspects of the present disclosure. FIG. 3A illustrates an example of a process flow 300-*a* that supports a registration of a device to a network in accordance with aspects of the present disclosure. The device associated with process flow 300-*a* may include UE 115, that may be examples of UE 115 as described herein with reference to FIG. 1. Process flow 300-*a* may also include AMF component 205-*a*, SMF component 305, SEAF component 210-*a*, and AUSF/ARPF component 215-*a*, that may be examples of AMF component, SMF component, UPF component, SEAF component, and AUSF/ARPF component as described herein with reference to FIG. 2.

At 310, UE 115 may transmit an attach request message to the AMF component 205-*a*. The attach request message may be an initial-NAS message. In some examples, the attach request message may include a UE identifier (ID), a subscriber user permanent ID, a UE network capability, or any combination thereof.

At 315, the AMF component 205-*a* may receive the attach request message and transmit a key request message to SEAF component 210-*a*. In some examples, the AMF component 205-*a* may receive the UE identifier ID, the subscriber user permanent ID, the UE network capability, or any combination thereof, and transmit this information in the key request message. SEAF component 210-*a* may be logically located in an HPLMN or a VPLMN. In some aspects, the SEAF component 210-*a* may be logically located in a same network as the SMF component 305.

At 320, the SEAF component 210-*a* may transmit the key request message to the AUSF/ARPF component 215-*a*. At 325, the AUSF/ARPF component 215-*a* may perform a mutual authentication with UE 115. At 330, in response to the mutual authentication, AUSF/ARPF component 215-*a* may transmit a key response message to SEAF component 210-*a*. In some examples, the key response message includes a SEAF key. The SEAF key may be UE-specific. Additionally, the SEAF key may be derived based on the authentication (i.e., mutual authentication) of the UE 115.

At 335, the SEAF component 210-*a* may transmit the key response message to the AMF component 205-*a*. In some examples, the key response message may be integrity protected by the SEAF component 210-*a*. For example, the SEAF component 210-*a* may generate an AMF encryption key and transmit the AMF encryption key with the key response message that includes the SEAF key.

At 340, the AMF component 205-*a* and UE 115 may perform NAS security mode command (SMC). In some examples the NAS SMC may establish a AMF key (or a NAS key) for secure delivery of NAS signaling messages between UE 115 and AMF component 205-*a*. In some examples, the NAS signaling messages may be in the control plane. In some aspects, the NAS SMC may include at least one of a selected security algorithm, a session policy for the PDU session, or a combination thereof. In some aspects, UE 115 and SMF component 305 may establish a SM NAS security connection, and the UE 115 may transmit the session request message over the established SM NAS security connection. At 345, the AMF component 205-*a* may transmit an attach accept message to UE 115. At 350, the UE 115 may transmit an attach complete message to the AMF component 205-*a*.

FIG. 3B illustrates an example of a process flow 300-*b* that supports session management authorization token in accordance with aspects of the present disclosure. Process flow 300-*b* may include UE 115, that may be examples of UE 115 as described herein with reference to FIG. 1 and FIG. 3A. Process flow 300-*b* may also include AMF component 205-*a*, SMF component 305, SEAF component 210-*a*, AUSF/ARPF component 215-*a*, and PCF component 245-*a*, that may be examples of AMF component, SMF component, UPF component, SEAF component, and AUSF/ARPF component as described herein with reference to FIGS. 2 through 3A.

At 360, UE 115 may transmit a service session request message to AMF component 205-*a*. In some examples, the service session request message may be to establish a PDU session for a logical data network (i.e., network slice) associated with UE 115. In some aspects, the service session request message may include one or more session parameters. The one or more session parameters may include one or more security algorithms selected by UE 115, a set of a security algorithms supported by UE 115, a QoS, etc. Additionally, the service session request message may include a logical network ID or a UE ID, or both. In some examples, UE 115 may integrity protect the service session request message based on a shared key between UE 115 and AMF component 205-*a* (e.g., SMF key derived using the SEAF key and slice (or service) ID).

At 360-*a*, UE 115 may transmit the service session request message to the SMF component 305. At 365, the SMF component 305 may in response to receiving the service session request message facilitate a subscription check by transmitting the service session request message to PCF component 245-*a*. The PCF component 245-*a* may transmit an indication to the SMF component 305 based on the subscription check. The indication may identify whether the UE is authorized to establish the PDU session.

At 370, the SMF component 305 may perform a policy decision. To perform the policy decision, SMF component 305 may obtain one or more session parameters requested by UE 115. Subsequent to obtaining the session parameters, SMF component 305 may determine session parameters based on UE 115 subscription profile, a logical data network policy, a third-party authorization, or any combination thereof. As a result, SMF component 305 may determine a session policy for the service session request message.

At 375, the SMF component 305 may transmit a key request message to the SEAF component 210-*a*. At 375-*a*, the SEAF component 210-*a* may transmit the key request message to the AUSF/ARPF component 215-*a*. The AUSF/ARPF component 215-*a* may maintain an authentication anchor key derived based on a successful authentication of the UE 115 (e.g., at 365). At 380, the AUSF/ARPF component 215-*a* may transmit a key response message to the SEAF component 210-*a*. The SEAF component 210-*a* derives an SMF key and transmits a key response message including the SMF key to the SMF component 305. The SEAF component 210-*a* may control whether SMF component 305 is authorized to serve UE 115 by strictly sending the SMF key to an authorized SMF component 305.

At 385, SMF component 305 may generate an authorization token. In some aspects, SMF component 305 may generate the authorization token based a message authentication code (MAC) function. The SMF key and the one or more session parameters may be inputs to the MAC function. At 390, SMF component 305 may transmit a service session response message to AMF component 205-a. At 390-a, the AMF component 205-a may transmit the service session response message to UE 115. The service session response message may include the generated authorization token. At 390-b, UE 115 may verify the authorization token to be assured that the SMF component 305 is authorized to serve UE 115. At 395-a, UE 115 may transmit a session response acknowledgment message to the SMF component 305. At 395-b, the SMF component 305 may verify the session response acknowledgement message received from UE 115. The session response acknowledgment message may indicate reception of the session response message including the authorization token.

Figure 4:
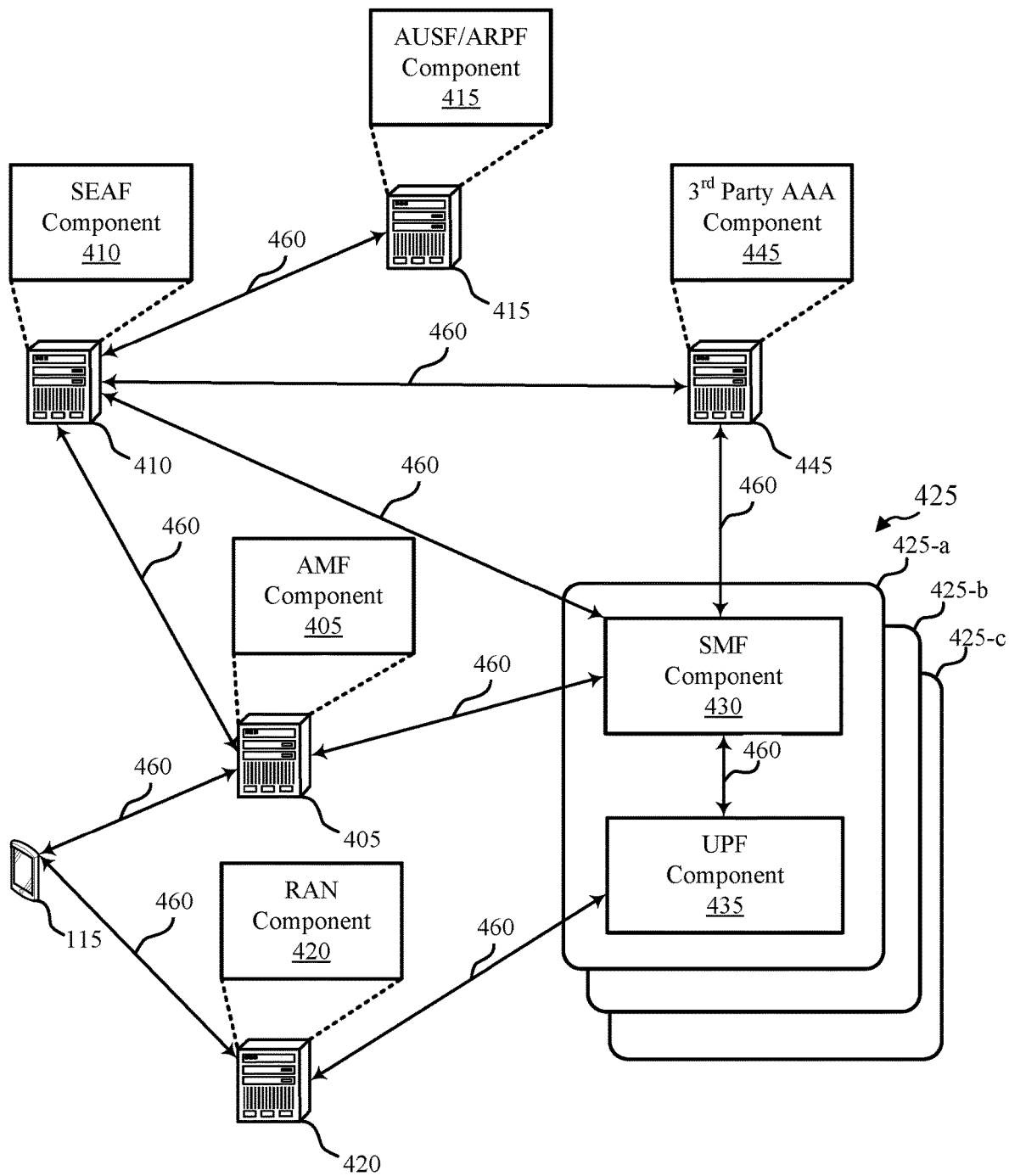
FIG. 4 illustrates an example of a wireless communication system for wireless communication that supports session management authorization token in accordance with aspects of the present disclosure.

FIG. 4 illustrates an example of a wireless communication system 400 for wireless communication that supports session management authorization token in accordance with aspects of the present disclosure. The wireless communication system 400 may include a UE 115, that may be examples of UE 115 as described herein with reference to FIG. 1. The wireless communication system 400 may also include a AMF component 405, a SEAF component 410, an AUSF/ARPF component 415, a RAN component 420, a group of logical data networks (i.e., network slices) 425, and a third-party AAA component 445.

In some examples, the group of logical data networks 425 may include a first logical data network 425-a, a second logical data network 425-b, and a third logical data network 425-c. the group of logical data networks 425 may, additionally, include an SMF component 430 and a UPF component 435. Communication links 460 shown in wireless communication system 400 may include uplink (UL) transmissions from UE 115 to one or more network entities (e.g., AMF component 405, SEAF component 410, AUSF/ARPF component 415, RAN component 420, group of logical data networks 425, and third-party AAA component 445), or downlink (DL) transmissions, from one or more of the network entities (e.g., AMF component 405, SEAF component 410, AUSF/ARPF component 415, RAN component 420, group of logical data networks 425, and third-party AAA component 445) to UE 115.

In some examples, the wireless communication system 400 for wireless communication that supports session management authorization token based on a secondary authentication. UE 115 may transmit a session request message to establish a session with one or more logical data networks of the group of logical data networks 425. The session may be a PDU session with one or more of the logical data networks 425. In some aspects, UE 115 and SMF component 430 may establish a SM NAS security connection, and the UE 115 may transmit the session request message over the established SM NAS security connection. The session request message may include a list of supported security algorithms and session requirements.

UE 115 may, additionally, integrity protect the session request message. In some examples, the SMF component 430 may verify the integrity protected session request message based on a key obtained from the SEAF component 410, i.e., SMF key. For example, UE 115 may derive a key to protect the session request message using a SEAF key (i.e., authentication anchor key associated with the UE 115). The SMF key, in some aspects, may not be available to the AMF component 405. SEAF component 410 may also derive the SMF key based on information of the SMF component 430. Additionally, SEAF component 410 may derive the SMF key based on the location of the SMF component 430, a logical data network type or ID (e.g., associated with at least one of the first logical data network 425-a, the second logical data network 425-b, and/or the third logical data network 425-c.). In some aspects, the SMF component 430 may be located in at least one of a VPLMN or HPLMN.

SMF component 430 in communication with UPF component 435 via communication links 460, and Third-party AAA component 445 and AUSF/ARPF component 215 may verify that the UE 115 is authorized to establish the PDU session for a corresponding logical data network (e.g., at least one logical data network slice from the group of logical data networks 425). In some examples, the SMF component 430 may transmit an integrity protected session response message to UE 115. The integrity protected session response message may be in some examples, only verified by the UE 115. SMF component 430 may obtain a SMF key from the SEAF component 410.

SEAF component 410 may maintain the SEAF key that is derived based on the verification (i.e., authentication) of the UE 115 via the third-party AAA component 445. The SEAF key may in some examples, be derived at the UE 115. In some examples, the SMF component 430 may interface with the third-party AAA component 445 directly. As a result, the SMF key may be derived based on a key sent by the third-party AAA component 445. Alternatively, the SMF component 430 may interface with the SEAF component 410, and the SEAF component 410 may interface with the third-party AAA component 445. In this aspect, a SEAF key is derived based on a key sent by the third-party AAA component to the SEAF component 410. A SMF key is then derived based on the SEAF key that the SMF component 430 obtained from the SEAF component 410. In some examples, the SMF component 430 interface with the third-party AAA component 445 directly. As a result, the SMF key may be derived based on a key sent by the third-party AAA component 445. Alternatively, the SMF component 430 may interface with the SEAF component 410, and the SEAF component 410 may interface with the third-party AAA component 445. In this aspect, a SEAF key is derived based on a key sent by the third-party AAA component to the SEAF component 410. A SMF key is then derived based on the SEAF key that the SMF component 430 obtained from the SEAF component 410.

In some examples, SMF component 430 may obtain session parameters or indication of services requested (e.g., establish a subscription with an eMBB slice, IoT slice, or a mission critical slice) by UE 115. SMF component 430 may determine the session parameters based on a UE 115 subscription profile, a logical data network policy, a third-party authorization, or any combination thereof. Third-party AAA component 445 may store the UE 115 subscription profile. As a result, Third-party AAA component 445 may provide the UE 115 subscription profile to SMF component 430. In some aspects, the third-party AAA component 445 may provide UE 115 service authorization information to the SMF component 430. In some aspects, SMF component 430 may determine a session policy for the requested session based on at least one of the UE 115 subscription profile, a logical data network policy, a third-party authorization, or any combination thereof. SMF component 430 may transmit the session policy in a session response message to UE 115.

SMF component 430 may also transmit a key request message to SEAF component 410. The key request message may include an ID of UE 115 and an ID of at least one of the logical data networks 425. AUSF/ARPF component 415 may authenticate the UE 115. AUSF/ARPF component 415 may transmit a key response message in response to the key request message and the authentication of UE 115. The key response message may include a SMF key. The SMF key in some examples, may be derived based on a SEAF key associated with UE 115.

SMF component 430 may determine whether a secondary authentication between UE 115 and the third-party AAA component 445 is required for approving the PDU session. The secondary authentication may be performed based on authentication message exchanged between UE 115, the SMF component 430, and the third-party AAA component 445. Additionally, the secondary authentication may be performed based on authentication message exchanged between UE 115, the SMF component 430, the SEAF component 410, and the third-party AAA component 445.

SMF component 430 may deliver authentication message exchanges between the UE 115 and third-party AAA component 445. In some examples, the authentication message exchanges may be delivered over a SM NAS connection between the UE 115 and the SMF component 430, and over an SM NAS connection between the SMF component 430 and the third-party AAA component 445. In some examples, the SMF component 430 may receive an indication from the third-party AAA component 445 that the UE 115 is authorized to establish the PDU session for the logical data network. The third-party AAA component 445 may also derive an SMF key and transmit a key response message including the SMF key to the SMF component 430. In some examples, the third-party AAA component 445 may transmit the key response message based on verifying that the UE is authorized to establish the PDU session. In some examples, the SMF key may be transmitted based an extensible authentication protocol (EAP). The third-party AAA component 445 may also transmit a master session key to the SMF component 430 based on a successful EAP authentication. The SMF component 430 may derive the SMF key using the master session key. Alternatively, the SMF component 430 may use the received master session key as the SMF key. The third-party AAA component 445 may transmit the master session key to the SMF component 430 in the key response message.

In some aspects, SMF component 430 may transmit SM NAS security mode command to UE 115. The SM NAS security mode command may include a selected security algorithm by the SMF component 430 and optionally service policy determined by the SMF component 430. The SM NAS security mode command may also include supported algorithms and session requirements provided by UE 115 (i.e., replays that UE 115 has transmitted in the session request message to make the UE 115 confirm the session parameters that the SMF component 430 received in a session request message, and therefore prevent bidding down attacks). In some examples, a hash of the supported algorithms and session requirements may be provided in the SM NAS security mode command to the UE 115 by SMF component 430. UE 115 may verify the received hash of the supported algorithms and session requirements. For example, UE 115 may store the session parameters transmitted to the SMF component 430 in the session request message. SMF component may use the stored session parameters to compute the hash in response to receiving the SM NAS security mode command from the SMF component 430. The SM NAS security mode command may include an ID of UE 115 and the SMF key derivation parameters associated with the SEAF component 410. The UE 115 may derive the SMF key based on the derivation parameters received from the SMF component 430. Subsequent to the deriving the SMF key, UE 115 may verify the SM NAS security mode command. If the SM NAS security mode command verification is successful, UE 115 may transmit a SM NAS security mode complete message to the SMF component 430.

SMF component 430 may generate an authorization token using the SMF key. In some examples, SMF component 430 may generate the authorization token based on a session request parameter. The session request parameter may be transmitted and part of the session request message. A session request parameter may include a security algorithm, a QoS, logical data network ID, etc. The SMF component 430 may generate the authorization token using a MAC generation function (e.g., HMAC-SHA-256/512, HMAC-SHA-3, CMAC, GMAC). The SMF key and one or more of the session parameter may be inputs to the MAC generation function. Alternatively, in some aspects an input parameter to the MAC generation function may be an indication of no security, i.e., the input parameter to the MAC generation function would only be the SMF key.

SMF component 430 may, additionally, generate the authorization token based on the SMF key and one or more additional session parameters. For example, SMF component 430 may generate the authorization token based on the SMF key, a session request parameter, logical data network ID, an SMF ID, a session counter, a session management message counter, a hash of the at least one of the selected security algorithm, the session policy for the PDU session, or a combination thereof. In some aspects, the session counter may be associated with a number of session that UE 115 has requested since joining a network. For example, SEAF component 410 may monitor and track the number of sessions that UE 115 has requested since joining the network. The session management message counter may be a counter to prevent replay attacks on AMF component 405. SMF component 430 may transmit a session response message including the generated authorization token to the UE 115, via AMF component 405.

Figure 5B:
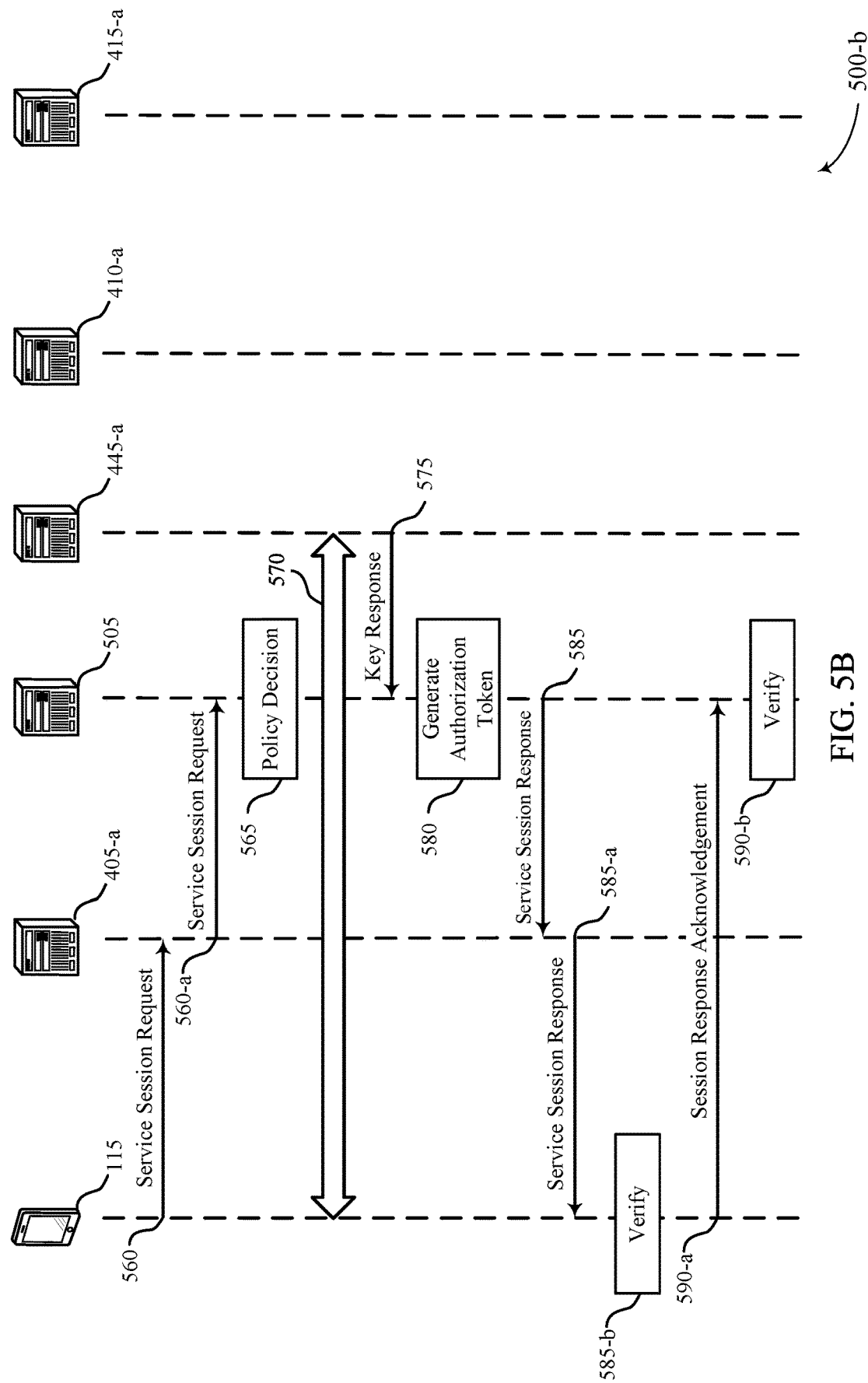

FIGS. 5A and 5B illustrates an example of a process flow 500 that supports session management authorization token in accordance with aspects of the present disclosure. FIG. 5A illustrates an example of a process flow 500-a that supports a registration of a device to a network in accordance with aspects of the present disclosure. A network device of process flow 500-a may include UE 115, that may be examples of UE 115 as described herein with reference to FIG. 1. Process flow 500-a may also include AMF component 405-a, SMF component 505, SEAF component 410-a, and AUSF/ARPF component 415-a, that may be examples of AMF component, SMF component, UPF component, SEAF component, and AUSF/ARPF component as described herein with reference to FIGS. 2 through 4.

At 510, UE 115 may transmit an attach request message to the AMF component 405-a. The attach request message may be an initial-NAS message within an RRC message. In some examples, the attach request message may include a UE identifier (ID), a subscriber user permanent ID, a UE network capability, or any combination thereof.

At 515, the AMF component 405-a may receive the attach request message and transmit a key request message to SEAF component 410-a. In some examples, the AMF component 405-a may receive the UE identifier ID, the subscriber user permanent ID, the UE network capability, or any combination thereof, and transmit this information in the key request message. SEAF component 410-a may be logically located in an HPLMN or a VPLMN. In some aspects, the SEAF component 410-a may be logically located in a same network as the SMF component 505.

At 520, the SEAF component 410-a may transmit the key request message to the AUSF/ARPF component 415-a. At 525, the AUSF/ARPF component 415-a may perform a mutual authentication with UE 115. At 530, in response to the mutual authentication, AUSF/ARPF component 415-a may transmit a key response message to SEAF component 410-a. In some examples, the key response message includes a SEAF key. The SEAF key may be UE-specific. Additionally, the SEAF key may be derived based on the authentication (i.e., mutual authentication) of the UE 115.

At 535, the SEAF component 410-a may transmit the key response message to the AMF component 405-a. In some examples, the key response message may be integrity protected by the SEAF component 410-a. For example, the SEAF component 410-a may generate an AMF encryption key and transmit the AMF encryption key with the key response message that includes the SEAF key.

At 540, the AMF component 405-a and UE 115 may perform NAS SMC. In some examples the NAS SMC may provide secure delivery of NAS signaling messages between UE 115 and AMF component 405-a. In some examples, the NAS signaling messages may be in the control plane. In some aspects, the NAS SMC may include at least one of a selected security algorithm, a session policy for the PDU session, or a combination thereof. At 545, the AMF component 405-a may transmit an attach accept message to UE 115. At 550, the UE 115 may transmit an attach complete message to the AMF component 405-a.

FIG. 5B illustrates an example of a process flow 500-b that supports session management authorization token in accordance with aspects of the present disclosure. Process flow 500-b may include UE 115, that may be examples of UE 115 as described herein with reference to FIG. 1 and FIG. 5A. Process flow 500-b may also include AMF component 405-a, SMF component 505, SEAF component 410-a, AUSF/ARPF component 415-a, and a third-party AAA component 445-a, that may be examples of AMF component, SMF component, UPF component, SEAF component, and AUSF/ARPF component as described herein with reference to FIGS. 2 through 5A.

At 560, UE 115 may transmit a service session request message to AMF component 405-a. In some examples, the service session request message may be to establish a PDU session for a logical data network (i.e., network slice) associated with UE 115. In some aspects, the service session request message may include one or more session parameters. The one or more session parameters may include a security algorithm, a QoS, etc. Additionally, the service session request message may include a logical network ID or a UE ID, or both. In some examples, UE 115 may integrity protect the service session request message based on a shared key between UE 115 and AMF component 405-a (e.g., SEAF key).

At 560-a, AMF 405-a may transmit the service session request message to the SMF component 505. At 565, the SMF component 505 may in response to receiving the service session request message perform a policy decision. To perform the policy decision, SMF component 505 may obtain one or more session parameters requested by UE 115. Subsequent to obtaining the session parameters, SMF component 505 may determine session parameters based on UE 115 subscription profile, a logical data network policy, a third-party authorization, or any combination thereof. As a result, SMF component 505 may determine a session policy for the service session request message. The session policy determination may need a secondary (EAP) authentication between the UE 115 and the third party AAA component 445-a associated with the service session request message (or data network access).

At 570, the SMF component 505 may deliver authentication message exchanges between the UE 115 and third-party AAA component 445-a. In some examples, the authentication message exchanges may be delivered over a SM NAS connection between the UE 115 and the SMF component 505, and over an SM NAS connection between the SMF component 505 and the third-party AAA component 445-a. In some examples, the SMF component 505 may receive an indication from the third-party AAA component 445-a that the UE 115 is authorized to establish the PDU session for the logical data network.

At 575, the third-party AAA component 445-a may derive an SMF key and transmit a key response message including the SMF key to the SMF component 505. The third party AAA component 445-a may control whether an SMF component 505 is authorized to serve UE 115 by strictly sending the SMF key to an authorized SMF component 505. In some examples, the third-party AAA component 445-a may transmit the key response message based on verifying that the UE is authorized to establish the PDU session. In some examples, the SMF key may be transmitted based an extensible authentication protocol (EAP) procedure.

At 580, SMF component 505 may generate an authorization token. In some aspects, SMF component 505 may generate the authorization token based a message authentication code (MAC) function. The SMF key and the one or more session parameters may be inputs to the MAC function. At 585, SMF component 505 may transmit a service session response message to AMF component 405-a. At 585-a, the AMF component 405-a may transmit the service session response message to UE 115. The service session response message may include the generated authorization token. At 585-b, UE 115 may verify the authorization token to be assured that the SMF component 505 is authorized to serve UE 115. At 590-a, UE 115 may transmit a session response acknowledgement message to SMF component 505. At 590-b, the SMF component may verify the session response acknowledgement message received from the UE including verifying the UE 115. The session response acknowledgment message may indicate reception of the session response message including the authorization token.

Figure 6:
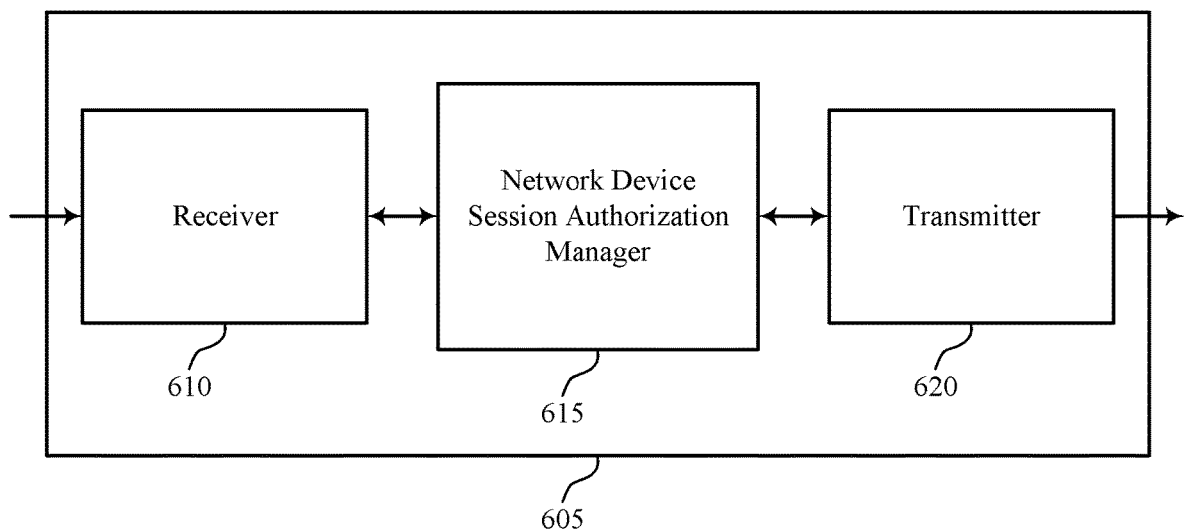
FIGS. 6 through 8 show block diagrams of a device that supports session management authorization token in accordance with aspects of the present disclosure.

FIG. 6 shows a block diagram 600 of a wireless device 605 that supports session management authorization token in accordance with various aspects of the present disclosure. Wireless device 605 may be an example of aspects of a network device 105 as described with reference to FIG. 1. Wireless device 605 may include receiver 610, network device session authorization manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to session management authorization token, etc.). Information may be passed on to other components of the device. The receiver 610 may be an example of aspects of the transceiver 935 described with reference to FIG. 9.

Wireless device 605 may include a network device session authorization manager 615. Network device session authorization manager 615 and/or at least some of its various sub-components may be implemented in hardware, software executed by a processor, firmware, or any combination thereof. If implemented in software executed by a processor, the functions of the network device session authorization manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The network device session authorization manager 615 and/or at least some of its various sub-components may be physically located at various positions, including being distributed such that portions of functions are implemented at different physical locations by one or more physical devices. In some examples, network device session authorization manager 615 and/or at least some of its various sub-components may be a separate and distinct component in accordance with various aspects of the present disclosure. In other examples, network device session authorization manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Network device session authorization manager 615 may receive a session request message to establish a PDU session for a logical data network associated with a UE, the session request message may include one or more session parameters. Network device session authorization manager 615 may verify that the UE is authorized to establish the PDU session for the logical data network, receive a key associated with the PDU session based on the verifying, generate an authorization token based on the received key and the session parameters, and transmit a session response message including the generated authorization token to the UE.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
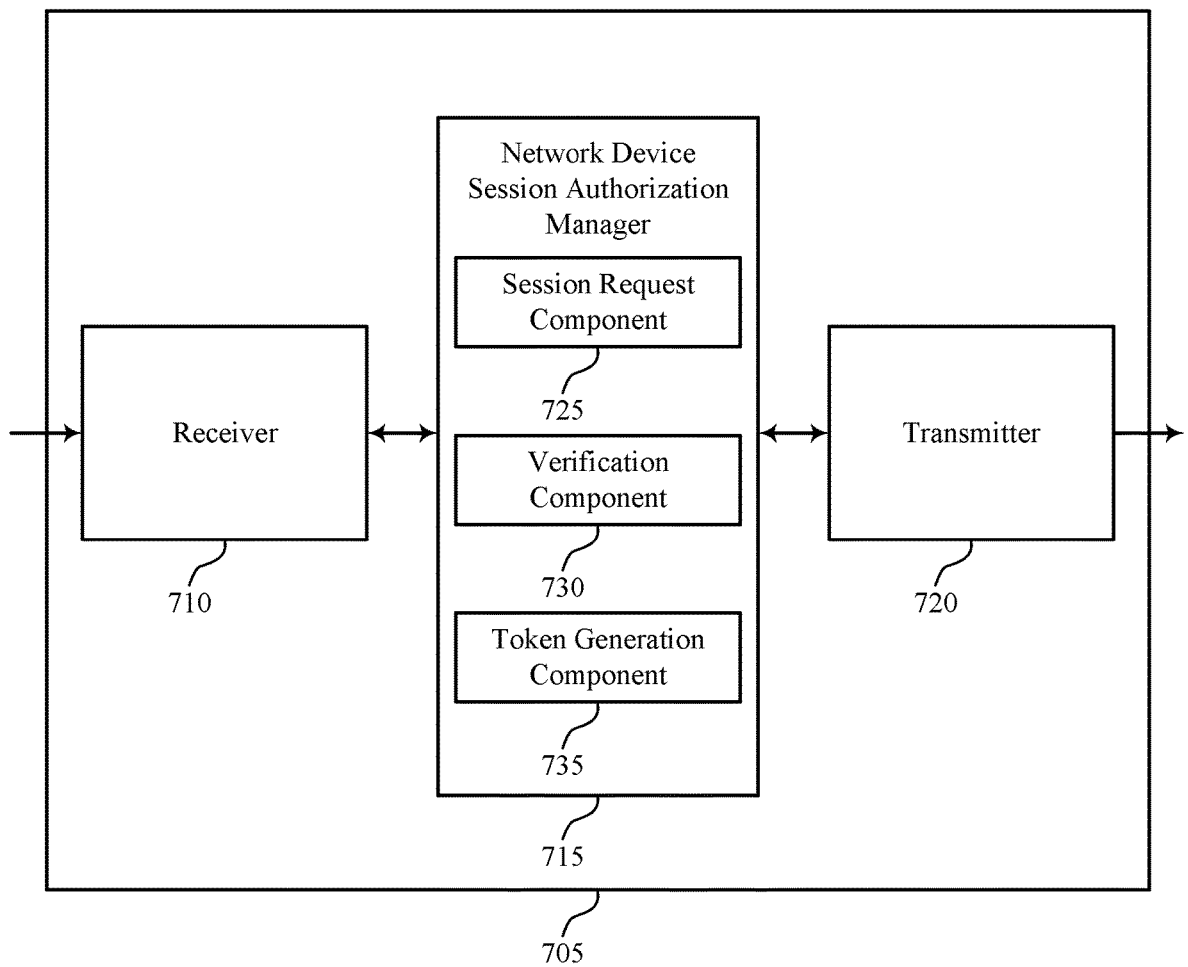

FIG. 7 shows a block diagram 700 of a wireless device 705 that supports session management authorization token in accordance with various aspects of the present disclosure. Wireless device 705 may be an example of aspects of a wireless device 605 or a network device 105 as described with reference to FIGS. 1 and 6. Wireless device 705 may include receiver 710, network device session authorization manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to session management authorization token, etc.). Information may be passed on to other components of the device. The receiver 710 may be an example of aspects of the transceiver 935 described with reference to FIG. 9.

Network device session authorization manager 715 may be an example of aspects of the network device session authorization manager 615 described with reference to FIG. 6. Network device session authorization manager 715 may also include session request component 725, verification component 730, and token generation component 735.

Session request component 725 may receive a session request message to establish a PDU session for a logical data network associated with a UE. The session request message may include one or more session parameters. Session request component 725 may transmit a session response message including the generated authorization token to the UE, and receive a key associated with the PDU session based on a verification of the session request message. In some aspects, the logical data network is associated with a network slice. In some aspects, receiving the key includes receiving the key from a SEAF, where the SEAF is a network function maintaining an authentication anchor key derived based on a successful authentication of the UE to a network. In some aspects, receiving the key includes receiving the key from a third-party AAA server based on an EAP. In some aspects, the session parameters includes at least one of a security algorithm, a QoS, or a combination thereof. In some aspects, the session request message is an integrity protected session request message based on a shared key between the UE and an AMF. In some aspects, the session request message is received at an SMF. In some aspects, the SMF is located at a serving network or a home network. In some aspects, the serving network include a VPLMN. In some aspects, the home network include a HPLMN. In some aspects, the session request message includes at least one of a logical network ID, a UE ID, or a combination thereof.

Verification component 730 may verify that the UE is authorized to establish the PDU session for the logical data network. Token generation component 735 may generate an authorization token based on the received key and the session parameters and generate the authorization token based on a MAC function. The SMF key and the session parameters may be inputs to the MAC function. In some aspects, generating the authorization token is based on a hash of at least one of a selected security algorithm, a session policy for the PDU session, or the combination thereof. In some aspects, the generated authorization token includes an indication as to whether the PDU session for the logical data network is authorized by the SMF.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
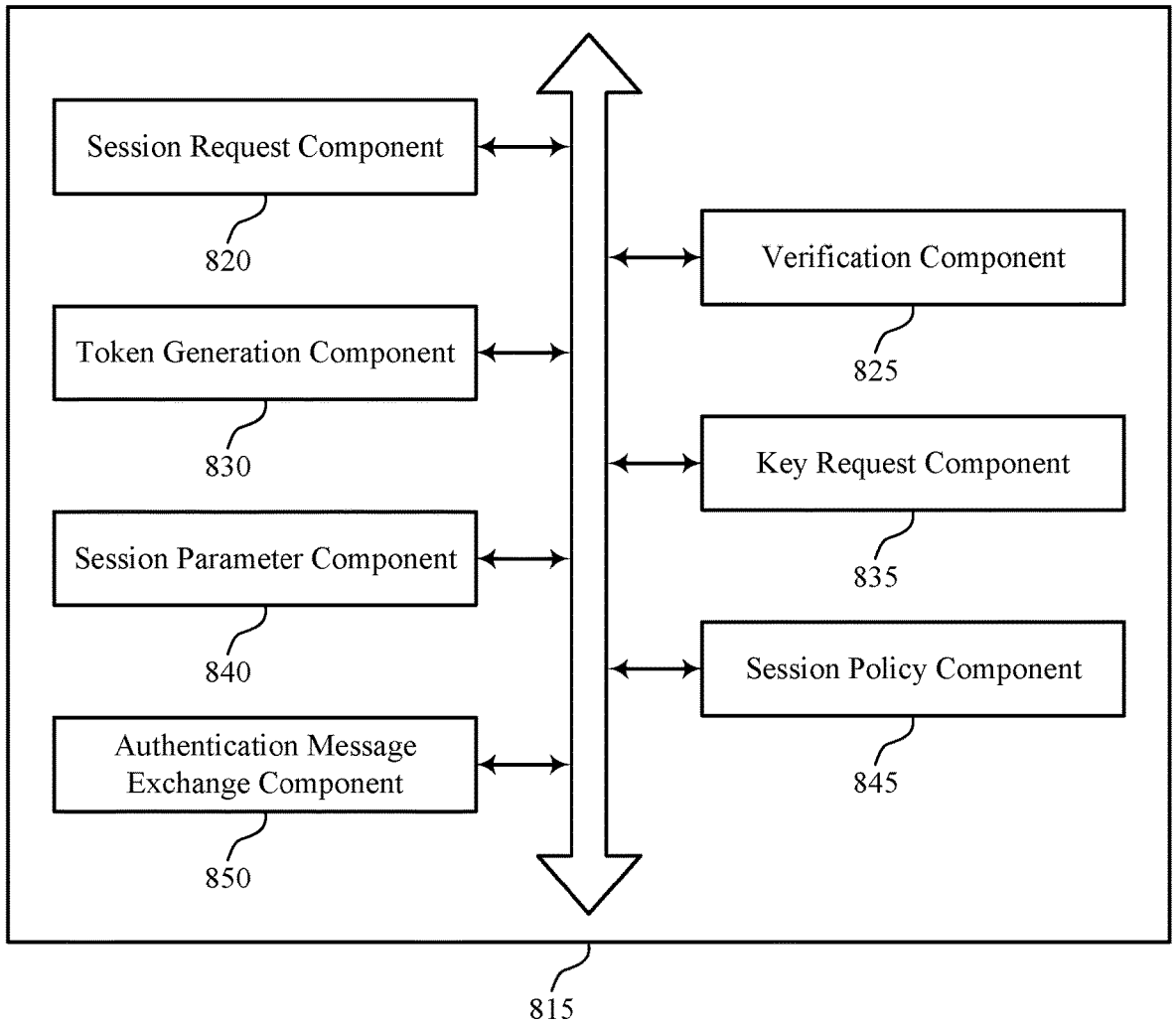

FIG. 8 shows a block diagram 800 of a network device session authorization manager 815 that supports session management authorization token in accordance with various aspects of the present disclosure. The network device session authorization manager 815 may be an example of aspects of a network device session authorization manager 615, a network device session authorization manager 715, or a network device session authorization manager 915 described with reference to FIGS. 6, 7, and 9. The network device session authorization manager 815 may include session request component 820, verification component 825, token generation component 830, key request component 835, session parameter component 840, session policy component 845, and authentication message exchange component 850. Each of these modules may communicate, directly or indirectly, with one another (e.g., via one or more buses).

Session request component 820 may receive a session request message to establish a PDU session for a logical data network associated with a UE. The session request message may include one or more session parameters. Session request component 820 may transmit a session response message including a generated authorization token to the UE. In some aspects, session request component 820 may receive a key associated with the PDU session based on a verification of the transmitted session request message. In some aspects, the logical data network is associated with a network slice. In some aspects, receiving the key includes receiving the key from a SEAF. The SEAF may be a network function maintaining an authentication anchor key derived based on a successful authentication of the UE to a network. Additionally, session request component 820 may receive the key from a third-party AAA server based on an EAP. In some aspects, the session parameters includes at least one of a security algorithm, a QoS, or a combination thereof. In some aspects, the session request message is an integrity protected session request message based on a shared key between the UE and an AMF. In some aspects, the session request message is received at an SMF. In some aspects, the SMF is located at a serving network or a home network. In some aspects, the serving network include a VPLMN. In some aspects, the home network include a HPLMN. In some aspects, the session request message includes at least one of a logical network ID, a UE ID, or a combination thereof.

Verification component 825 may verify that the UE is authorized to establish the PDU session for the logical data network. Token generation component 830 may generate an authorization token based on the received key and the session parameters. Alternatively, token generation component 830 may generate the authorization token based on a MAC function, where the SMF key and the one or more session parameters are inputs to the MAC function. In some aspects, the generated authorization token is based on a hash of at least one of a selected security algorithm, a session policy for the PDU session, or the combination thereof. In some aspects, the generated authorization token includes an indication as to whether the PDU session for the logical data network is authorized by the SMF.

Key request component 835 may transmit a key request message including an ID of the UE and an ID of the logical data network. Key request component 835 may receive a key response message in response to the key request message. The key response message may include a SMF key. Additionally, key request component 835 may receive the key response message from a SEAF and receive the SMF key in the key response message. The SMF key may be derived based on a SEAF key associated with the SEAF. In some examples, the key request component 835 may integrity protect the session response message based on the SEAF key.

Session parameter component 840 may obtain session parameters requested by the UE and determine session parameters based on a UE subscription profile, a logical data network policy, a third-party authorization, or any combination thereof. Session policy component 845 may determine a session policy for the PDU session based on the determining and transmit the session policy in the session response message to the UE.

Authentication message exchange component 850 may deliver authentication message exchanges between the UE and an AAA server over a SM NAS connection between the UE and a SMF, and over an SM NAS connection between the SMF and the AAA server. The authentication message exchange component 850 may receive an indication from the AAA server whether the UE is authorized to establish the PDU session for the logical data network in response to the authentication message exchanges. In some aspects, authentication message exchange component 850 may receive a master session key from the third-party server based on the authentication protocol indicating that the UE is authorized to establish the PDU session, derive the SMF key based on the master session key, and transmit an SM NAS security mode command to the UE. The SN NAS security mode command may include at least one of a selected security algorithm, a session policy for the PDU session, or a combination thereof. In some aspects, receiving the key response message is based on the indication that the UE is authorized to establish the PDU session. In some aspects, the SMF key is derived by the AAA server. Authentication message exchange component 850 may receive a session response acknowledgment message from the UE; and verify the UE based on the session response acknowledgment message.

Figure 9:
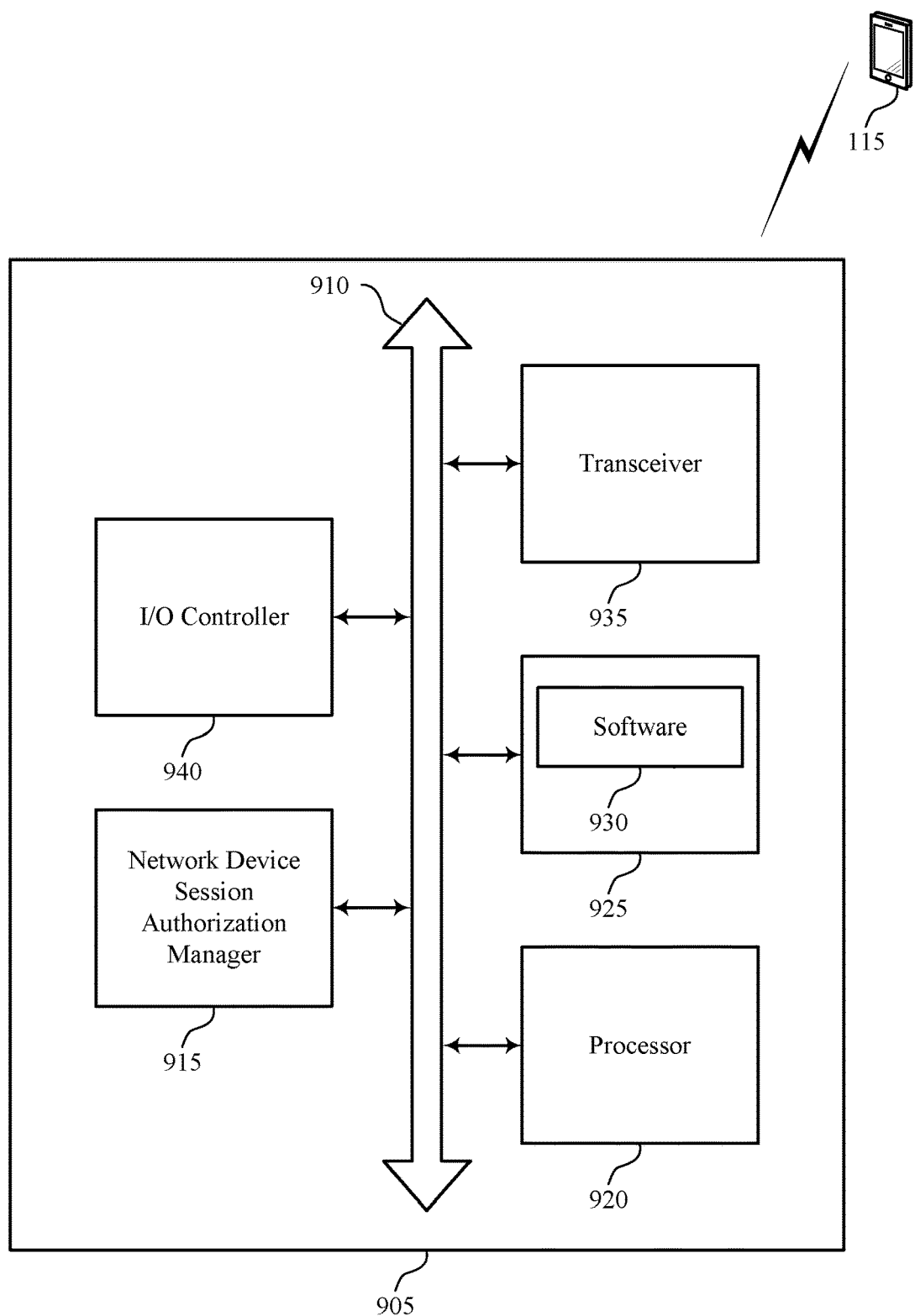
FIG. 9 illustrates a block diagram of a system including a network device that supports session management authorization token in accordance with aspects of the present disclosure.

FIG. 9 shows a diagram of a system 900 including a device 905 that supports session management authorization token in accordance with various aspects of the present disclosure. Device 905 may be an example of or include the components of wireless device 605, wireless device 705, or a network device 105 as described above, e.g., with reference to FIGS. 1, 6, and 7. Device 905 may include components for bi-directional voice and data communications including components for transmitting and receiving communications, including network device session authorization manager 915, processor 920, memory 925, software 930, transceiver 935, and I/O controller 940. These components may be in electronic communication via one or more busses (e.g., bus 910).

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some aspects, processor 920 may be configured to operate a memory array using a memory controller. In other aspects, a memory controller may be integrated into processor 920. Processor 920 may be configured to execute computer-readable instructions stored in a memory to perform various functions (e.g., functions or tasks supporting session management authorization token).

Memory 925 may include random access memory (RAM) and read only memory (ROM). The memory 925 may store computer-readable, computer-executable software 930 including instructions that, when executed, cause the processor to perform various functions described herein. In some aspects, the memory 925 may contain, among other things, a basic input/output system (BIOS) that may control basic hardware and/or software operation such as the interaction with peripheral components or devices. Software 930 may include code to implement aspects of the present disclosure, including code to support session management authorization token. Software 930 may be stored in a non-transitory computer-readable medium such as system memory or other memory. In some aspects, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

I/O controller 940 may manage input and output signals for device 905. I/O controller 940 may also manage peripherals not integrated into device 905. In some aspects, I/O controller 940 may represent a physical connection or port to an external peripheral. In some aspects, I/O controller 940 may utilize an operating system such as iOS®, ANDROID®, MS-DOS®, MS-WINDOWS®, OS/2®, UNIX®, LINUX®, or another known operating system. In other aspects, I/O controller 940 may represent or interact with a modem, a keyboard, a mouse, a touchscreen, or a similar device. In some aspects, I/O controller 940 may be implemented as part of a processor. In some aspects, a user may interact with device 905 via I/O controller 940 or via hardware components controlled by I/O controller 940.

Figure 10:
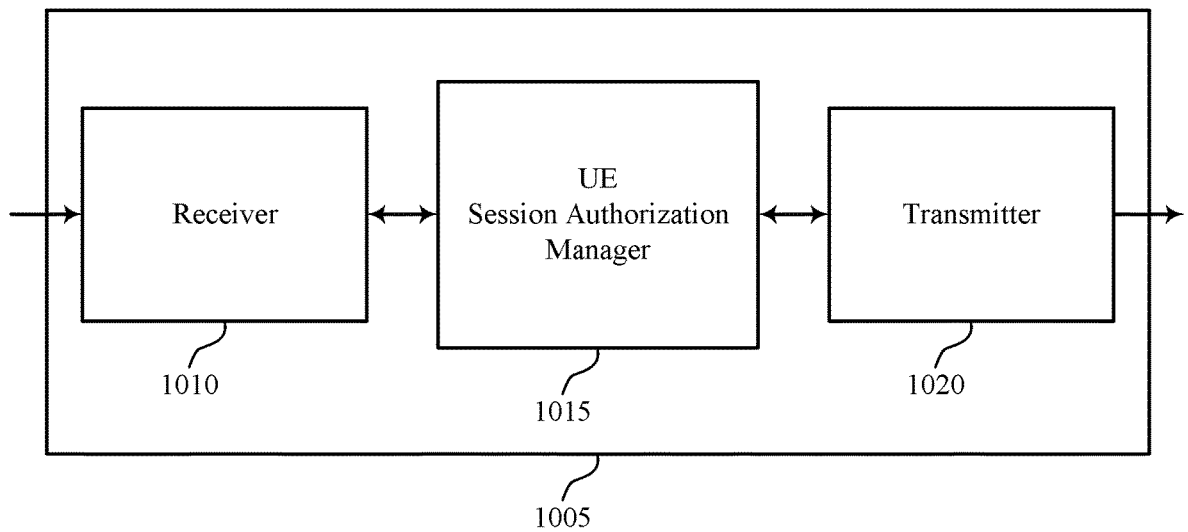
FIGS. 10 through 12 show block diagrams of a device that supports session management authorization token in accordance with aspects of the present disclosure.

FIG. 10 shows a block diagram 1000 of a wireless device 1005 that supports session management authorization token in accordance with various aspects of the present disclosure. Wireless device 1005 may be an example of aspects of a UE 115 as described with reference to FIG. 1. Wireless device 1005 may include receiver 1010, UE session authorization manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to session management authorization token, etc.). Information may be passed on to other components of the device. The receiver 1010 may be an example of aspects of the transceiver 1335 described with reference to FIG. 13.

Wireless device 1005 may include a UE session authorization manager 1015. UE session authorization manager 1015 and/or at least some of its various sub-components may be implemented in hardware, software executed by a processor, firmware, or any combination thereof. If implemented in software executed by a processor, the functions of the UE session authorization manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE session authorization manager 1015 and/or at least some of its various sub-components may be physically located at various positions, including being distributed such that portions of functions are implemented at different physical locations by one or more physical devices. In some examples, UE session authorization manager 1015 and/or at least some of its various sub-components may be a separate and distinct component in accordance with various aspects of the present disclosure. In other examples, UE session authorization manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE session authorization manager 1015 may transmit a session request message to establish a PDU session for a logical data network. In some examples, the session request message may include one or more session parameters. UE session authorization manager 1015 may receive a session response message including an authorization token that is based on a SMF key and one or more of the session parameters.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may include a single antenna, or it may include a set of antennas.

Figure 11:
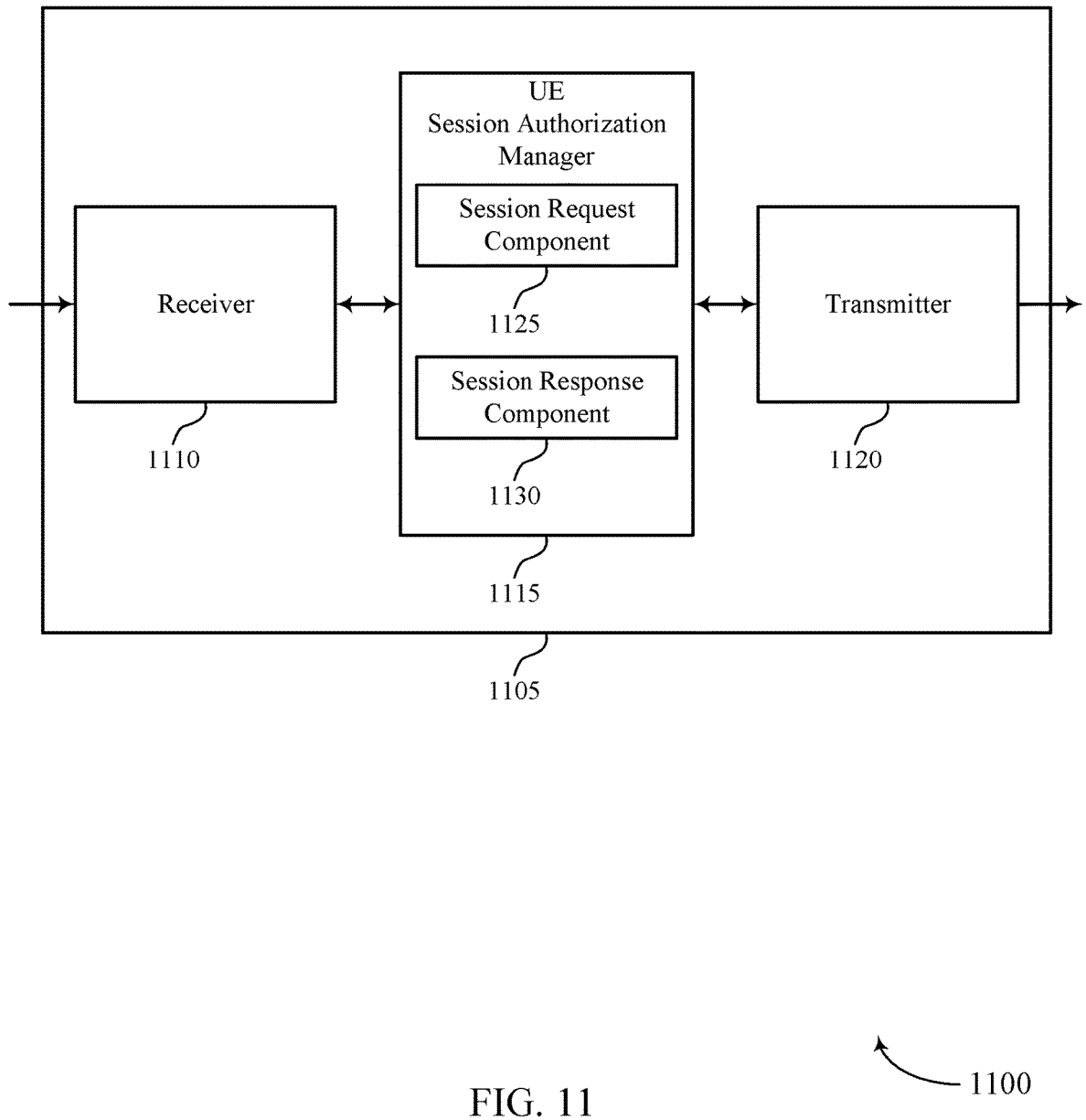

FIG. 11 shows a block diagram 1100 of a wireless device 1105 that supports session management authorization token in accordance with various aspects of the present disclosure. Wireless device 1105 may be an example of aspects of a network device 105 or a UE 115 as described with reference to FIGS. 1 and 13. Wireless device 1105 may include receiver 1110, UE session authorization manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to session management authorization token, etc.). Information may be passed on to other components of the device. The receiver 1110 may be an example of aspects of the transceiver 1335 described with reference to FIG. 13.

UE session authorization manager 1115 may be an example of aspects of the UE session authorization manager 1015 described with reference to FIG. 10. UE session authorization manager 1115 may also include session request component 1125 and session response component 1130. Session request component 1125 may transmit a session request message to establish a PDU session for a logical data network. In some examples, the session request message may include one or more session parameters. Session request component 1125 may integrity protect the session request message based on a SMF key derived from an authentication anchor key maintained by a SEAF. In some aspects, the session request message includes at least one of a security algorithm, a QoS, or a combination thereof. Session response component 1130 may receive a session response message including an authorization token that is based on a SMF key and the session parameters.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may include a single antenna, or it may include a set of antennas.

Figure 12:
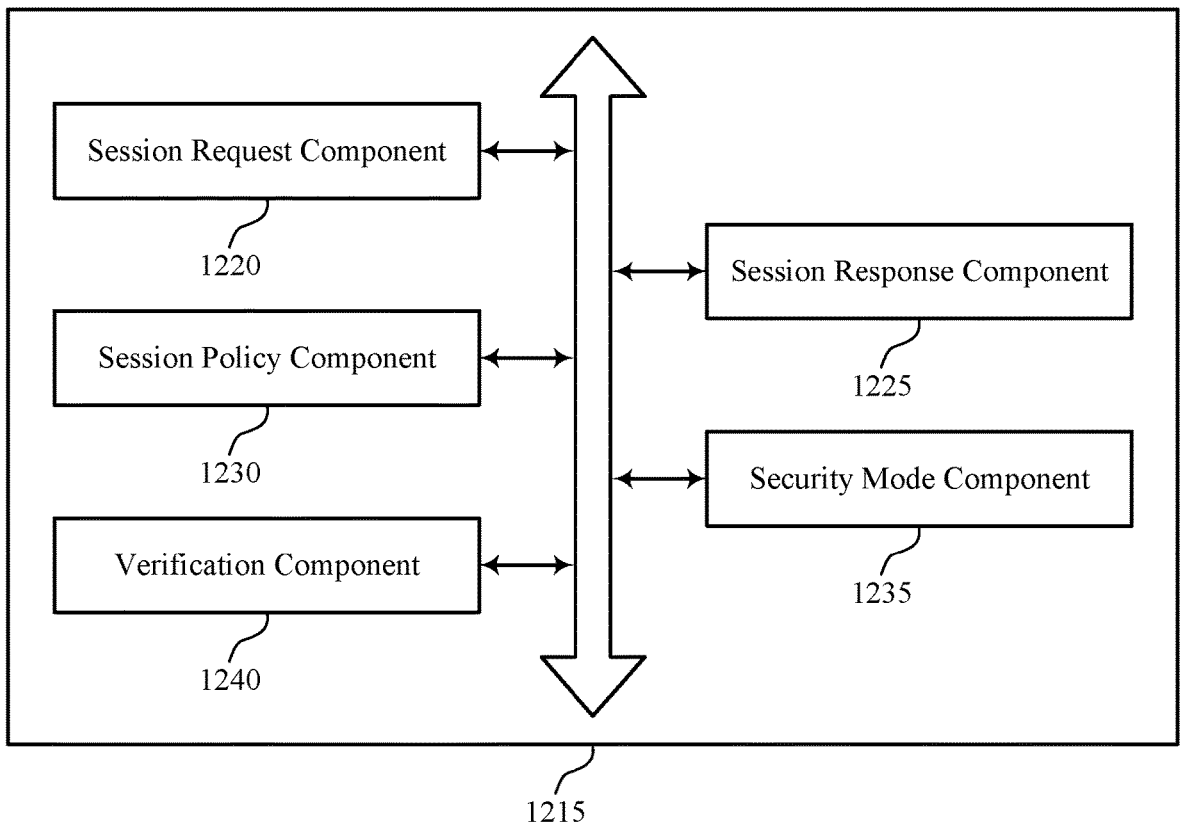

FIG. 12 shows a block diagram 1200 of a UE session authorization manager 1215 that supports session management authorization token in accordance with various aspects of the present disclosure. The UE session authorization manager 1215 may be an example of aspects of a UE session authorization manager 1215 described with reference to FIGS. 10 and 11. The UE session authorization manager 1215 may include session request component 1220, session response component 1225, session policy component 1230, security mode component 1235, and verification component 1240. Each of these modules may communicate, directly or indirectly, with one another (e.g., via one or more buses).

Session request component 1220 may transmit a session request message to establish a PDU session for a logical data network. In some examples, the session request message may include one or more session parameters. Session request component 1220 may also integrity protect the session request message based on a SMF key derived from an authentication anchor key maintained by a SEAF. In some aspects, the session request message includes at least one of a security algorithm, a QoS, or a combination thereof.

Session response component 1225 may receive a session response message including an authorization token that is based on a SMF key and one or more of the session parameters. Session policy component 1230 may receive a session policy for the PDU session. In some aspects, the session policy is associated with at least one of a logical network ID, a UE ID, or a combination thereof. Session response component 1225 may generate a session response acknowledgment message; and transmit the session response acknowledgment message to a SMF. The session response acknowledgment message may indicate reception of the session response message including the authorization token.

Security mode component 1235 may receive a SM NAS security mode command. The SN NAS security mode command may include at least one of a selected security algorithm, a session policy for the PDU session, or a combination thereof. The security mode component 1235 may transmit a SM NAS security mode complete message based on a verification of the transmitted session request message. Verification component 1240 may verify the SM NAS security mode command based on the transmitted session request message.

Figure 13:
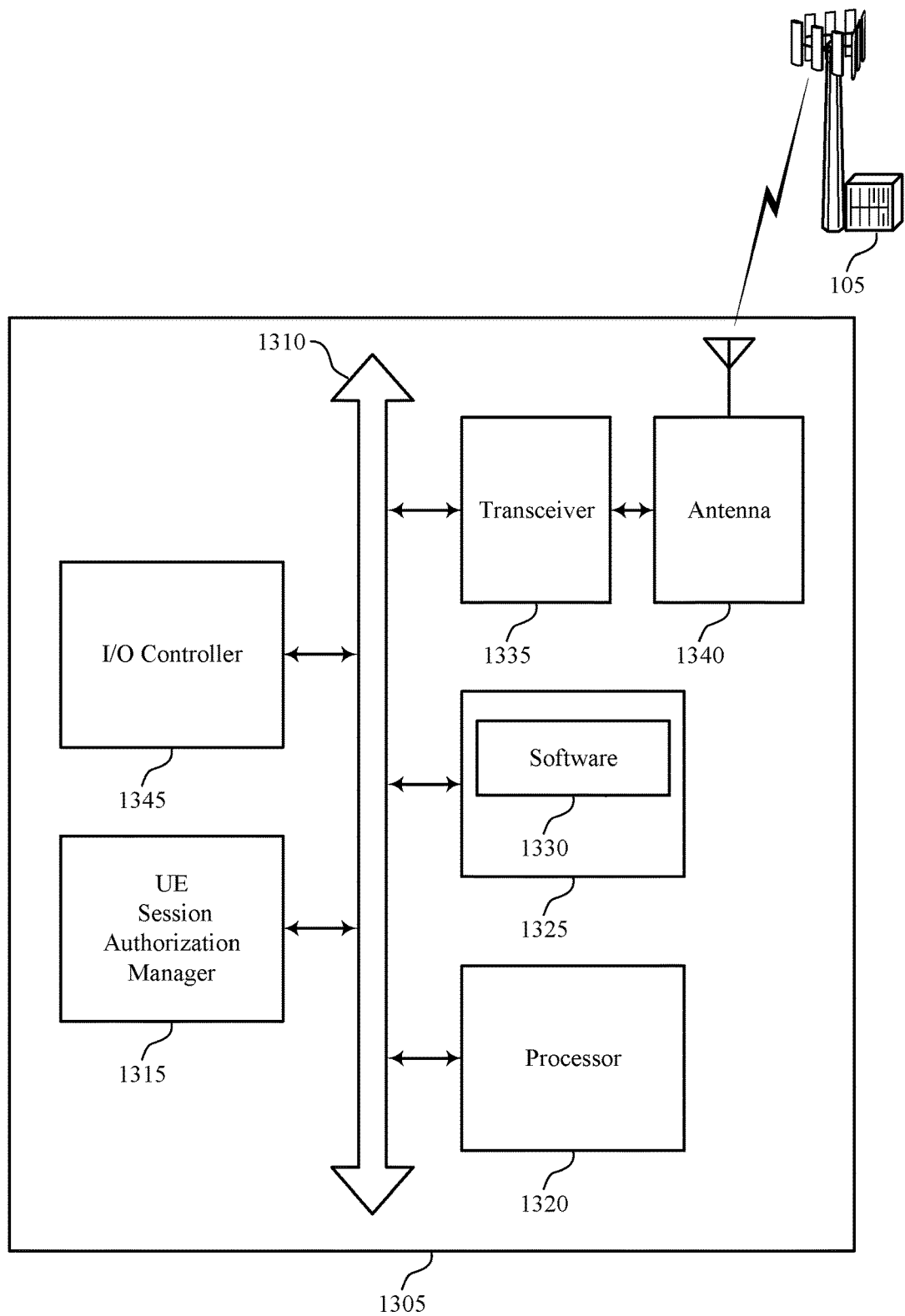
FIG. 13 illustrates a block diagram of a system including a UE that supports session management authorization token in accordance with aspects of the present disclosure.

FIG. 13 shows a diagram of a system 1300 including a device 1305 that supports session management authorization token in accordance with various aspects of the present disclosure. Device 1305 may be an example of or include the components of UE 115 as described above, e.g., with reference to FIG. 1. Device 1305 may include components for bi-directional voice and data communications including components for transmitting and receiving communications, including UE session authorization manager 1315, processor 1320, memory 1325, software 1330, transceiver 1335, antenna 1340, and I/O controller 1345. These components may be in electronic communication via one or more busses (e.g., bus 1310). Device 1305 may communicate wirelessly with one or more network devices 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some aspects, processor 1320 may be configured to operate a memory array using a memory controller. In other aspects, a memory controller may be integrated into processor 1320. Processor 1320 may be configured to execute computer-readable instructions stored in a memory to perform various functions (e.g., functions or tasks supporting session management authorization token).

Memory 1325 may include RAM and ROM. The memory 1325 may store computer-readable, computer-executable software 1330 including instructions that, when executed, cause the processor to perform various functions described herein. In some aspects, the memory 1325 may contain, among other things, a BIOS that may control basic hardware and/or software operation such as the interaction with peripheral components or devices.

Software 1330 may include code to implement aspects of the present disclosure, including code to support session management authorization token. Software 1330 may be stored in a non-transitory computer-readable medium such as system memory or other memory. In some aspects, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some aspects, the wireless device may include a single antenna 1340. However, in some aspects the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some aspects, I/O controller 1345 may represent a physical connection or port to an external peripheral. In some aspects, I/O controller 1345 may utilize an operating system such as iOS®, ANDROID®, MS-DOS®, MS-WINDOWS®, OS/2®, UNIX®, LINUX®, or another known operating system. In other aspects, I/O controller 1345 may represent or interact with a modem, a keyboard, a mouse, a touchscreen, or a similar device. In some aspects, I/O controller 1345 may be implemented as part of a processor. In some aspects, a user may interact with device 1305 via I/O controller 1345 or via hardware components controlled by I/O controller 1345.

Figure 14:
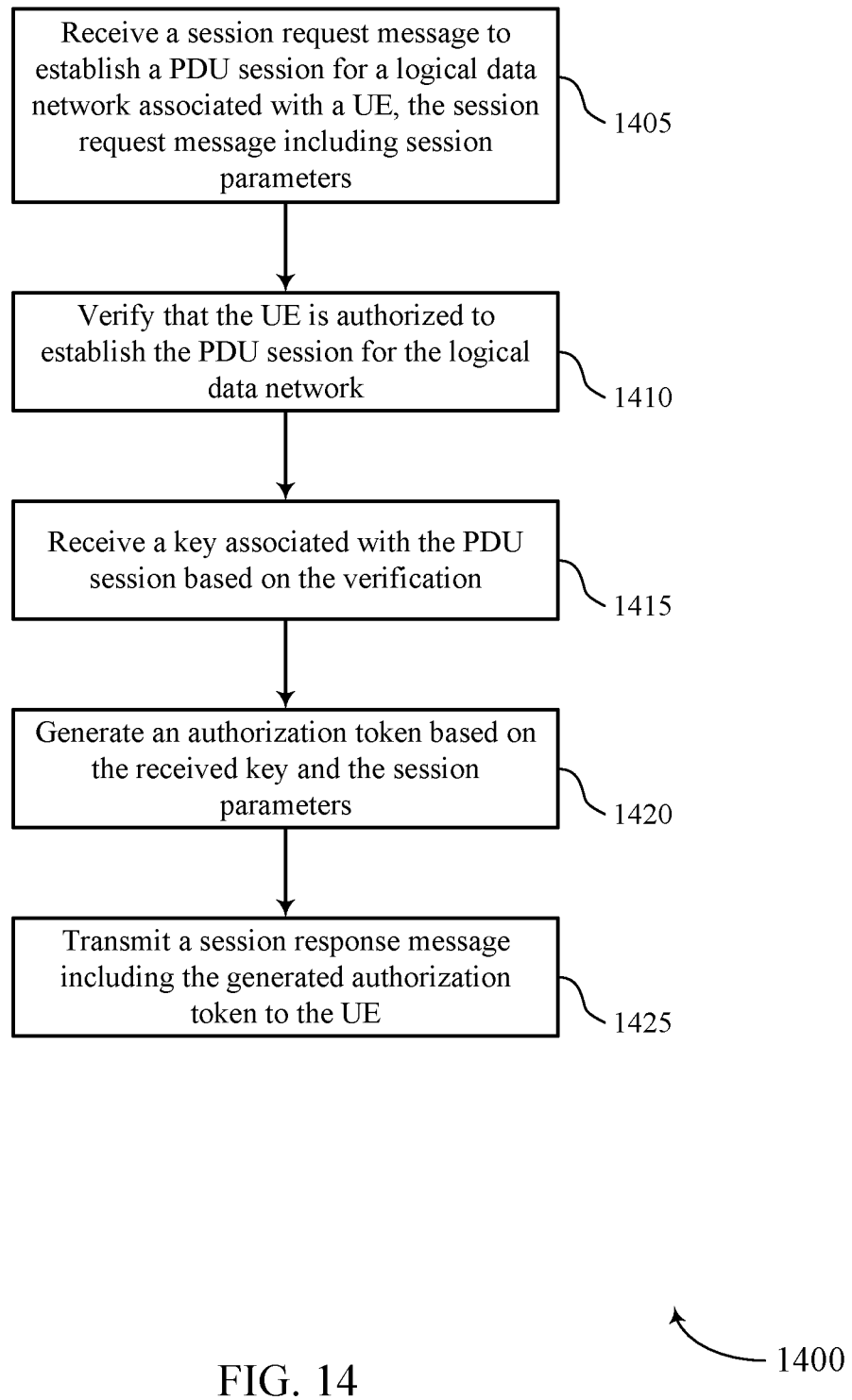
FIGS. 14 through 18 illustrate methods for session management authorization token in accordance with aspects of the present disclosure.

FIG. 14 shows a flowchart illustrating a method 1400 for session management authorization token in accordance with various aspects of the present disclosure. The operations of method 1400 may be implemented by a network device 105 or its components as described herein. For example, the operations of method 1400 may be performed by a network device session authorization manager as described with reference to FIGS. 6 through 9. In some examples, a network device 105 may execute a set of codes to control the functional elements of the device to perform the functions described below. Additionally, the network device 105 may perform aspects of the functions described below using special-purpose hardware.

At block 1405 the network device 105 may receive a session request message to establish a PDU session for a logical data network associated with a UE, the session request message may include one or more session parameters. The operations of block 1405 may be performed according to the methods described with reference to FIGS. 6 through 9. In certain examples, aspects of the operations of block 1405 may be performed by a session request component as described with reference to FIGS. 7 through 8.

At block 1410 the network device 105 may verify that the UE is authorized to establish the PDU session for the logical data network. The operations of block 1410 may be performed according to the methods described with reference to FIGS. 6 through 9. In certain examples, aspects of the operations of block 1410 may be performed by a verification component as described with reference to FIGS. 7 through 8.

At block 1415 the network device 105 may receive a key associated with the PDU session based on the verifying. The operations of block 1415 may be performed according to the methods described with reference to FIGS. 6 through 9. In certain examples, aspects of the operations of block 1415 may be performed by a session request component as described with reference to FIGS. 7 through 8.

At block 1420 the network device 105 may generate an authorization token based on the received key and the session parameters. The operations of block 1420 may be performed according to the methods described with reference to FIGS. 6 through 9. In certain examples, aspects of the operations of block 1420 may be performed by a token generation component as described with reference to FIGS. 7 through 8.

At block 1425 the network device 105 may transmit a session response message comprising the generated authorization token to the UE. The operations of block 1425 may be performed according to the methods described with reference to FIGS. 6 through 9. In certain examples, aspects of the operations of block 1425 may be performed by a session request component as described with reference to FIGS. 7 through 8.

Figure 15:
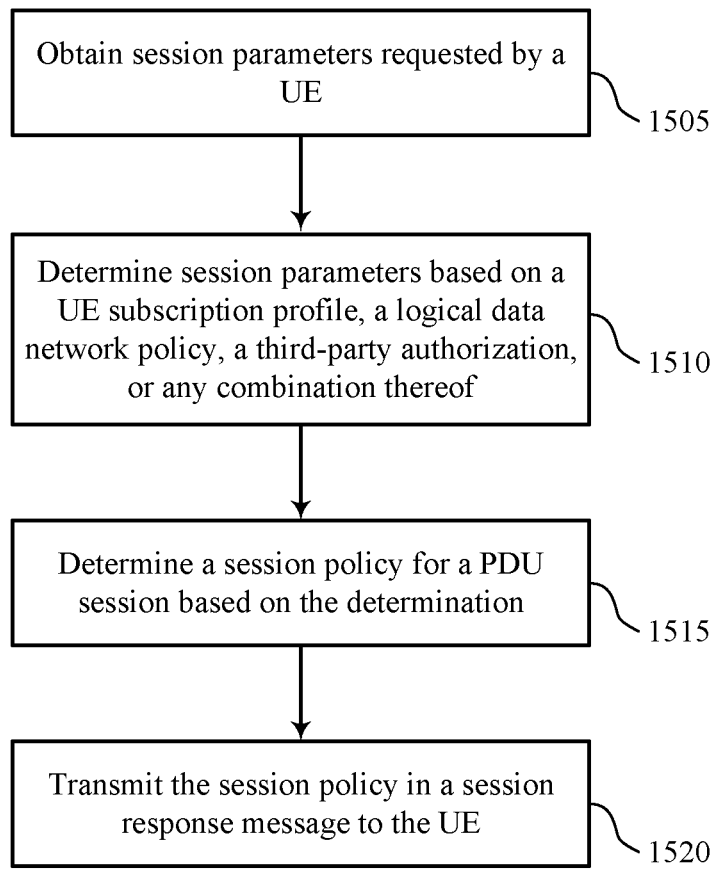

FIG. 15 shows a flowchart illustrating a method 1500 for session management authorization token in accordance with various aspects of the present disclosure. The operations of method 1500 may be implemented by a network device 105 or its components as described herein. For example, the operations of method 1500 may be performed by a network device session authorization manager as described with reference to FIGS. 6 through 9. In some examples, a network device 105 may execute a set of codes to control the functional elements of the device to perform the functions described below. Additionally, the network device 105 may perform aspects of the functions described below using special-purpose hardware.

At block 1505 the network device 105 may obtain session parameters requested by a UE. The operations of block 1505 may be performed according to the methods described with reference to FIGS. 6 through 9. In certain examples, aspects of the operations of block 1505 may be performed by a session parameter component as described with reference to FIG. 8.

At block 1510 the network device 105 may determine one or more session parameters based on a UE subscription profile, a logical data network policy, a third-party authorization, or any combination thereof. The operations of block 1510 may be performed according to the methods described with reference to FIGS. 6 through 9. In certain examples, aspects of the operations of block 1510 may be performed by a session parameter component as described with reference to FIG. 8.

At block 1515 the network device 105 may determine a session policy for a PDU session based on the determination. The operations of block 1515 may be performed according to the methods described with reference to FIGS. 6 through 9. In certain examples, aspects of the operations of block 1515 may be performed by a session policy component as described with reference to FIG. 8.

At block 1520 the network device 105 may transmit the session policy in a session response message to the UE. The operations of block 1520 may be performed according to the methods described with reference to FIGS. 6 through 9. In certain examples, aspects of the operations of block 1520 may be performed by a session policy component as described with reference to FIG. 8.

Figure 16:
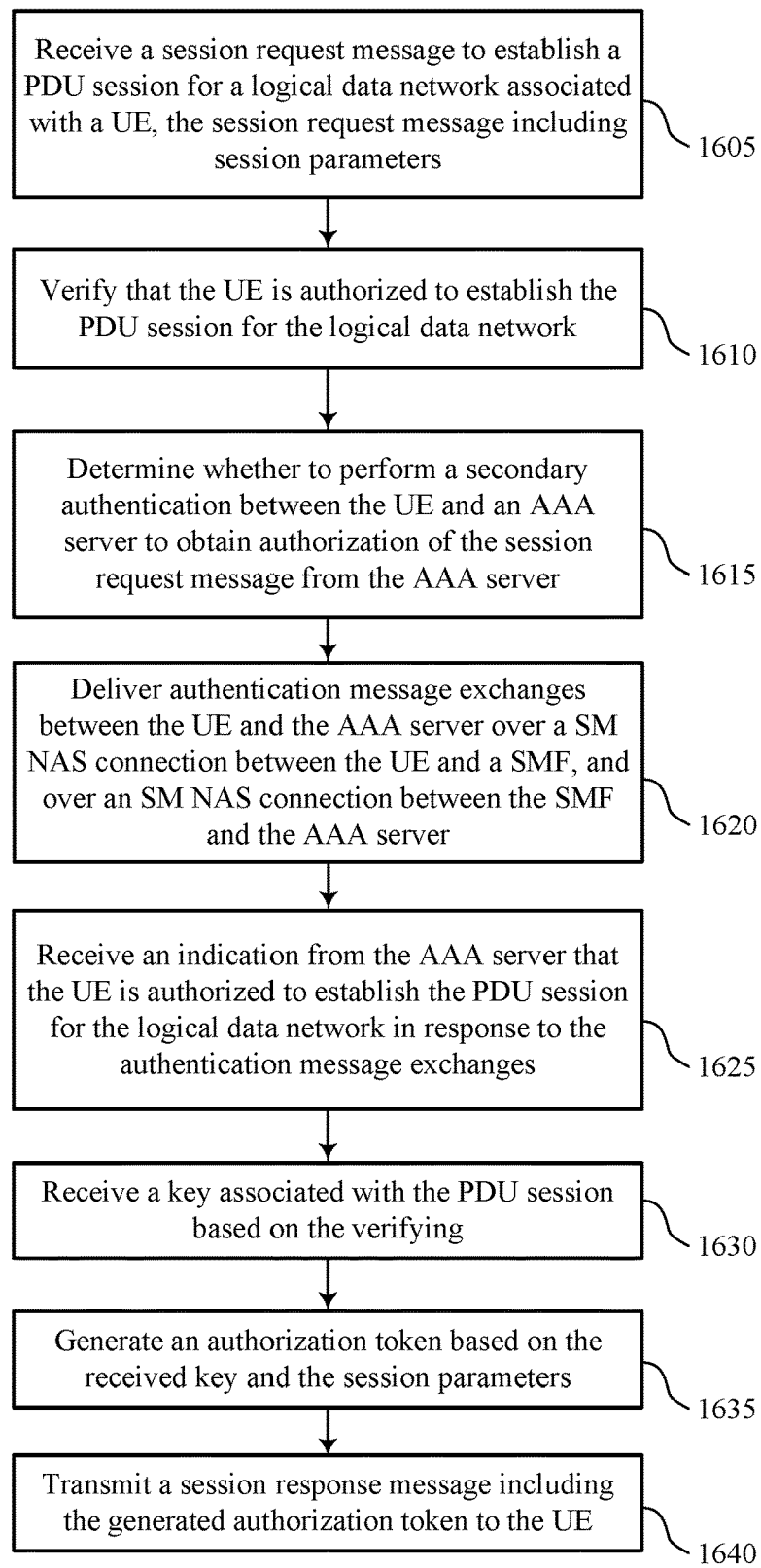

FIG. 16 shows a flowchart illustrating a method 1600 for session management authorization token in accordance with various aspects of the present disclosure. The operations of method 1600 may be implemented by a network device 105 or its components as described herein. For example, the operations of method 1600 may be performed by a network device session authorization manager as described with reference to FIGS. 6 through 9. In some examples, a network device 105 may execute a set of codes to control the functional elements of the device to perform the functions described below. Additionally, the network device 105 may perform aspects of the functions described below using special-purpose hardware.

At block 1605 the network device 105 may receive a session request message to establish a PDU session for a logical data network associated with a UE, the session request message may include one or more session parameters. The operations of block 1605 may be performed according to the methods described with reference to FIGS. 6 through 9. In certain examples, aspects of the operations of block 1605 may be performed by a session request component as described with reference to FIGS. 7 through 8.

At block 1610 the network device 105 may verify that the UE is authorized to establish the PDU session for the logical data network. The operations of block 1610 may be performed according to the methods described with reference to FIGS. 6 through 9. In certain examples, aspects of the operations of block 1610 may be performed by a verification component as described with reference to FIGS. 7 through 8.

At block 1615 the network device 105 may determine whether to perform a secondary authentication between the UE and an AAA server to obtain authorization of the session request message from the AAA server. The determination may be based on a session policy, etc. The operations of block 1615 may be performed according to the methods described with reference to FIGS. 6 through 9. In certain examples, aspects of the operations of block 1615 may be performed by a authentication message exchange component as described with reference to FIG. 8

At block 1620 the network device 105 may deliver authentication message exchanges between the UE and the AAA server over a SM NAS connection between the UE and a SMF, and over an SM NAS connection between the SMF and the AAA server. The operations of block 1620 may be performed according to the methods described with reference to FIGS. 6 through 9. In certain examples, aspects of the operations of block 1620 may be performed by a authentication message exchange component as described with reference to FIG. 8.

At block 1625 the network device 105 may receive an indication from the AAA server that (or whether) the UE is authorized to establish the PDU session for the logical data network in response to the authentication message exchanges. The operations of block 1625 may be performed according to the methods described with reference to FIGS. 6 through 9. In certain examples, aspects of the operations of block 1625 may be performed by a authentication message exchange component as described with reference to FIG. 8.

At block 1630 the network device 105 may receive a key associated with the PDU session based on the verification. The operations of block 1630 may be performed according to the methods described with reference to FIGS. 6 through 9. In certain examples, aspects of the operations of block 1630 may be performed by a session request component as described with reference to FIGS. 7 through 8.

At block 1635 the network device 105 may generate an authorization token based on the received key and the one or more session parameters. The operations of block 1635 may be performed according to the methods described with reference to FIGS. 6 through 9. In certain examples, aspects of the operations of block 1635 may be performed by a token generation component as described with reference to FIGS. 7 through 8.

At block 1640 the network device 105 may transmit a session response message including the generated authorization token to the UE. The operations of block 1640 may be performed according to the methods described with reference to FIGS. 6 through 9. In certain examples, aspects of the operations of block 1640 may be performed by a session request component as described with reference to FIGS. 7 through 8.

Figure 17:
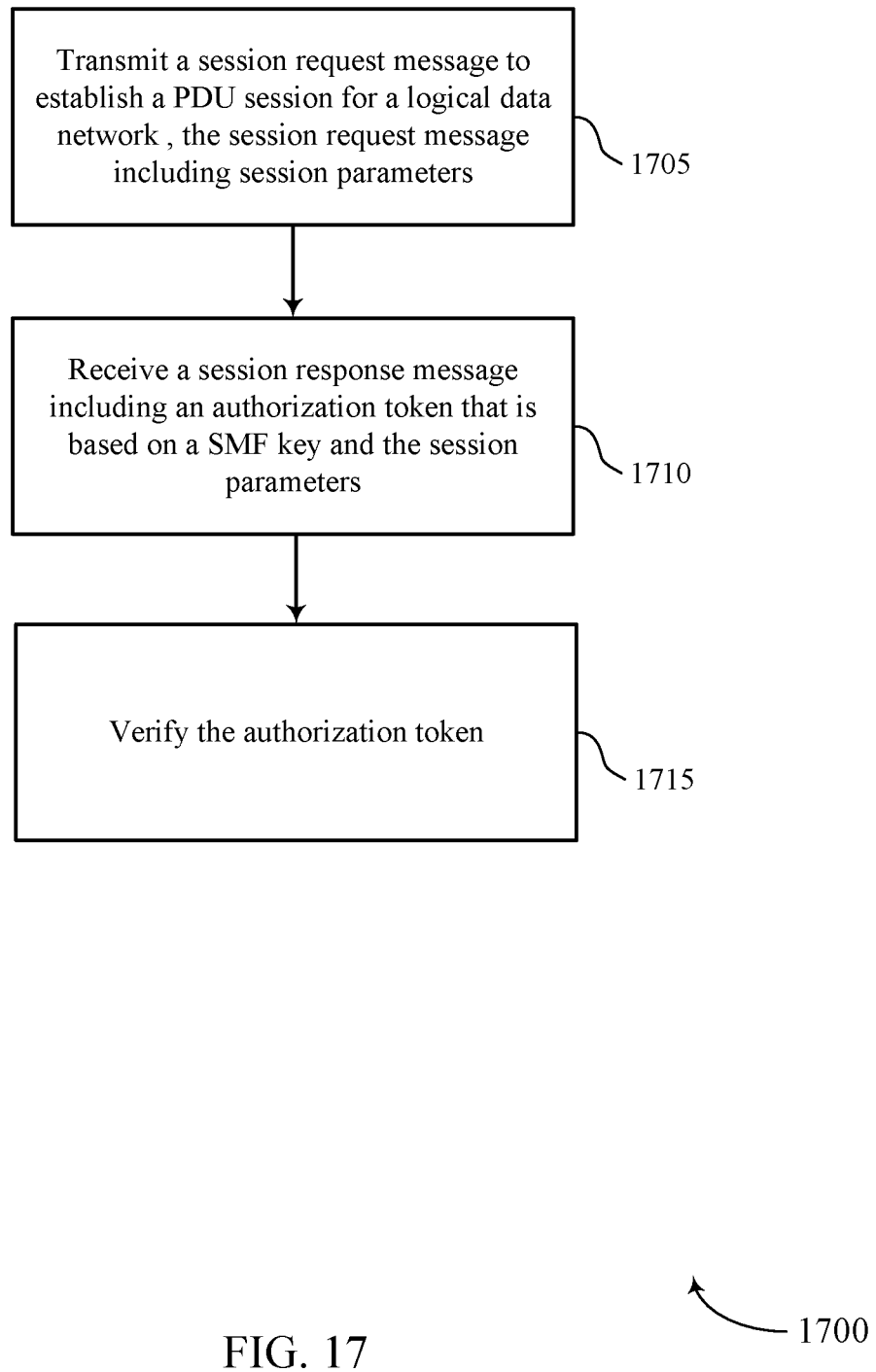

FIG. 17 shows a flowchart illustrating a method 1700 for session management authorization token in accordance with various aspects of the present disclosure. The operations of method 1700 may be implemented by a UE 115 or its components as described herein. For example, the operations of method 1700 may be performed by a UE session authorization manager as described with reference to FIGS. 10 through 13. In some examples, a UE 115 may execute a set of codes to control the functional elements of the device to perform the functions described below. Additionally, the UE 115 may perform aspects of the functions described below using special-purpose hardware.

At block 1705 the UE 115 may transmit a session request message to establish a PDU session for a logical data network, the session request message may include one or more session parameters. The operations of block 1705 may be performed according to the methods described with reference to FIGS. 10 through 13. In certain examples, aspects of the operations of block 1705 may be performed by a session request component as described with reference to FIGS. 11 through 12.

At block 1710 the UE 115 may receive a session response message that may include an authorization token that is based on a SMF key and the one or more session parameters. The operations of block 1710 may be performed according to the methods described with reference to FIGS. 10 through 13. In certain examples, aspects of the operations of block 1710 may be performed by a session response component as described with reference to FIGS. 11 through 12.

At block 1715 the UE 115 may verify the authorization token. The operations of block 1715 may be performed according to the methods described with reference to FIGS. 10 through 13. In certain examples, aspects of the operations of block 1710 may be performed by a verification component as described with reference to FIGS. 11 through 12.

Figure 18:
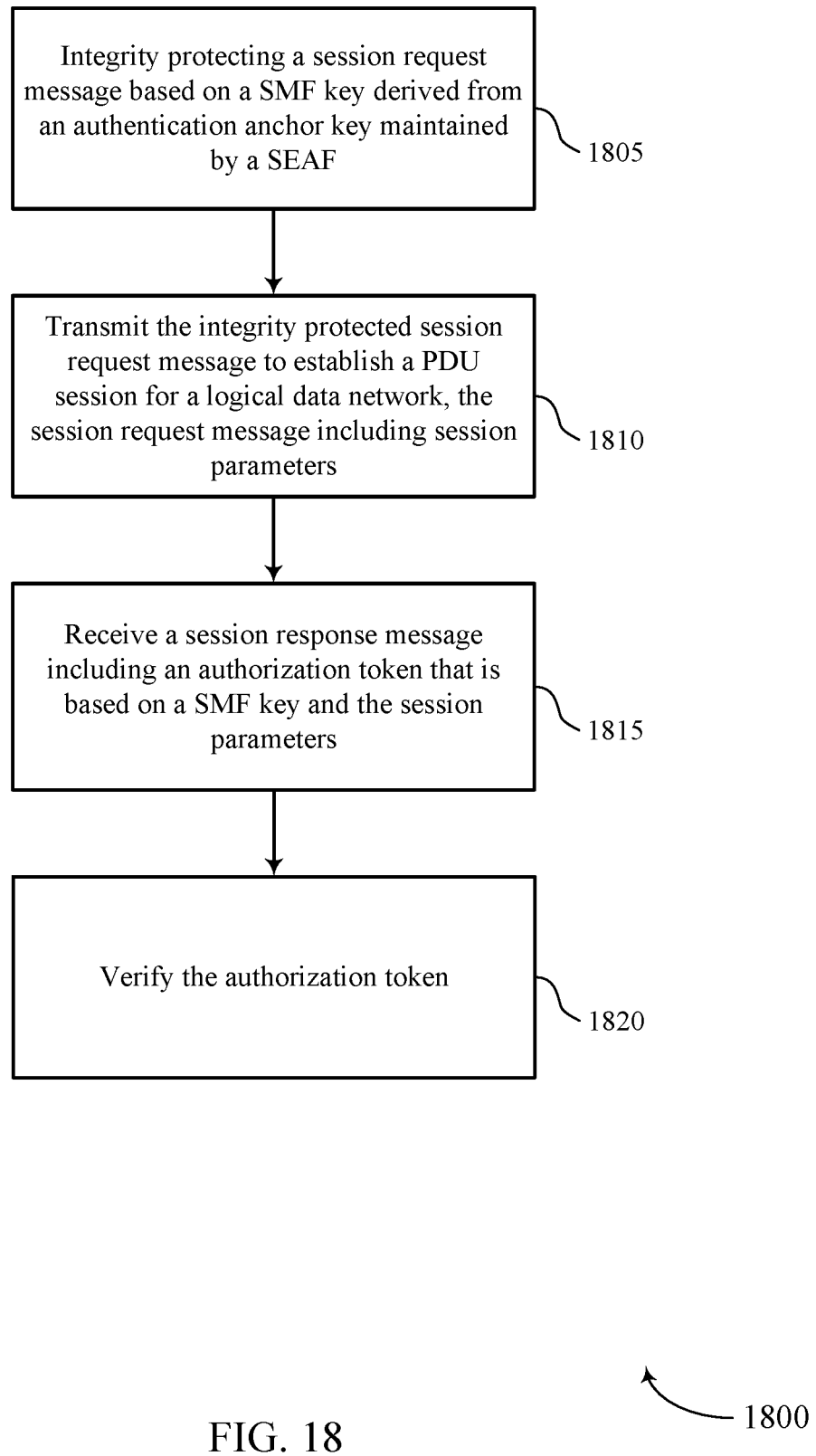

FIG. 18 shows a flowchart illustrating a method 1800 for a session management authorization token in accordance with various aspects of the present disclosure. The operations of method 1800 may be implemented by a UE 115 or its components as described herein. For example, the operations of method 1800 may be performed by a UE session authorization manager as described with reference to FIGS. 10 through 13. In some examples, a UE 115 may execute a set of codes to control the functional elements of the device to perform the functions described below. Additionally, the UE 115 may perform aspects of the functions described below using special-purpose hardware.

At block 1805 the UE 115 may integrity protect a session request message based on a SMF key derived from an authentication anchor key maintained by a SEAF. The operations of block 1805 may be performed according to the methods described with reference to FIGS. 10 through 13. In certain examples, aspects of the operations of block 1805 may be performed by a session request component as described with reference to FIGS. 11 through 12.

At block 1810 the UE 115 may transmit the integrity protected session request message to establish a PDU session for a logical data network. In some examples, the session request message may include one or more session parameters. The operations of block 1810 may be performed according to the methods described with reference to FIGS. 10 through 13. In certain examples, aspects of the operations of block 1810 may be performed by a session request component as described with reference to FIGS. 11 through 12.

At block 1815 the UE 115 may receive a session response message that may include an authorization token that is based on a SMF key and the one or more session parameters. The operations of block 1815 may be performed according to the methods described with reference to FIGS. 10 through 13. In certain examples, aspects of the operations of block 1815 may be performed by a session response component as described with reference to FIGS. 11 through 12.

At block 1820 the UE 115 may verify the authorization token. The operations of block 1820 may be performed according to the methods described with reference to FIGS. 10 through 13. In certain examples, aspects of the operations of block 1820 may be performed by a verification component as described with reference to FIGS. 11 through 12.

It should be noted that the methods described above describe possible implementations, and that the operations and the operations may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in that different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary operation that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    receiving a session request message, to establish a protocol data unit (PDU) session for a logical data network comprising one or more network slices, associated with a user equipment (UE), the session request message comprising session parameters including network slice information associated with the one or more network slices;
    delivering authentication message exchanges between the UE and a third-party authentication, authorization, and accounting (AAA) server over a session management (SM) non-access stratum (NAS) connection between the UE and a session management function (SMF), and over an SM NAS connection between the SMF and the AAA server;
    verifying that the UE is authorized to establish the PDU session for the logical data network based at least in part on the authentication message exchanges;
    receiving a key associated with the PDU session based at least in part on the verifying;
    generating an authorization token based at least in part on the received key and the network slice information; and
    transmitting a session response message comprising the generated authorization token to the UE.

2. The method of claim 1, wherein receiving the key comprises receiving an SMF key from a security anchor function (SEAF), wherein the SEAF is a network function maintaining an authentication anchor key derived based at least in part on a successful authentication of the UE to a network.

3. The method of claim 2, wherein receiving the key comprises:
    receiving the SMF key, wherein the SMF key is derived based at least in part on a SEAF key associated with the SEAF; and
    integrity protecting the session response message based at least in part on the SMF key.

4. The method of claim 1, wherein receiving the key comprises receiving the key from the third-party AAA server based at least in part on an extensible authentication protocol (EAP).

5. The method of claim 1, further comprising:
    transmitting a key request message comprising an identifier (ID) of the UE and an identifier (ID) of the logical data network; and
    receiving a key response message in response to the key request message, the key response message comprising a session management function (SMF) key.

6. The method of claim 1, wherein the session parameters comprises one or more of a security algorithm or a quality-of-service (QoS).

7. The method of claim 1, further comprising:
    obtaining the session parameters requested by the UE;
    determining the session parameters based at least in part on a UE subscription profile, a logical data network policy, a third-party authorization, or any combination thereof;
    determining a session policy for the PDU session based at least in part on one or more of the UE subscription profile, the logical data network policy, or the third-party authorization; and
    transmitting the session policy in the session response message to the UE.

8. The method of claim 1, wherein the session request message comprises one or more of a logical network identifier (ID) or a UE identifier (ID).

9. The method of claim 1, wherein generating the authorization token further comprises:
    generating the authorization token based at least in part on a message authentication code (MAC) function, wherein a session management function (SMF) key and the session parameters are inputs to the MAC function.

10. The method of claim 1, wherein the session request message is an integrity protected session request message based at least in part on a shared key between the UE and an access and mobility management function (AMF).

11. The method of claim 1, further comprising:
    receiving an indication from the third-party AAA server whether the UE is authorized to establish the PDU session for the logical data network in response to the authentication message exchanges; and
    receiving a key response message in response to a key request message based at least in part on the indication that the UE is authorized to establish the PDU session, the key response message comprising an SMF key.

12. The method of claim 11, wherein the SMF key is derived by the third-party AAA server.

13. The method of claim 11, further comprising:
receiving a master session key from the third-party AAA server based at least in part on the indication that the UE is authorized to establish the PDU session; and
deriving the SMF key based at least in part on the master session key.

14. The method of claim 11, wherein delivering the authentication message exchanges between the UE and the third-party AAA server over the SM NAS connection further comprises:
transmitting an SM NAS security mode command to the UE, wherein the SM NAS security mode command comprises one or more of a selected security algorithm or a session policy for the PDU session.

15. The method of claim 1, wherein generating the authorization token is based at least in part on a hash of one or more of a selected security algorithm or a session policy for the PDU session.

16. The method of claim 1, wherein the session request message is received at a session management function (SMF).

17. The method of claim 16, wherein the generated authorization token comprises an indication as to whether the PDU session for the logical data network is authorized by the SMF.

18. The method of claim 1, further comprising:
receiving a session response acknowledgment message from the UE; and
verifying the UE based at least in part on the session response acknowledgment message.

19. A method for wireless communication at a user equipment (UE), comprising:
transmitting a session request message to establish a protocol data unit (PDU) session for a logical data network comprising one or more network slices, the session request message comprising session parameters including network slice information associated with the one or more network slices;
receiving a session management (SM) non-access stratum (NAS) security mode command, wherein the SM NAS security mode command comprises one or more of a selected security algorithm or a session policy for the PDU session;
verifying the SM NAS security mode command based at least in part on the session request message;
transmitting an SM NAS security mode complete message based at least in part on verifying the SM NAS security mode command; and
receiving a session response message comprising an authorization token that is based at least in part on a session management function (SMF) key and the network slice information.

20. The method of claim 19, further comprising:
integrity protecting the session request message based at least in part on the SMF key derived from an authentication anchor key maintained by a security anchor function (SEAF).

21. The method of claim 19, wherein the session request message comprises one or more of a security algorithm or a quality-of-service (QoS).

22. The method of claim 19, further comprising:
receiving a session policy for the PDU session, wherein the session policy is associated with at least one of a logical network identifier (ID), a user equipment (UE) identifier (ID).

23. The method of claim 19, wherein receiving the session response message further comprises:
generating a session response acknowledgment message;
transmitting the session response acknowledgment message to a SMF; and
verifying the authorization token.

24. An apparatus for wireless communication, in a system comprising:
a processor;
memory in electronic communication with the processor; and
instructions stored in the memory and operable, when executed by the processor, to cause the apparatus to:
receive a session request message, to establish a protocol data unit (PDU) session for a logical data network comprising one or more network slices, associated with a user equipment (UE), the session request message comprising session parameters including network slice information associated with the one or more network slices;
deliver authentication message exchanges between the UE and a third-party authentication, authorization, and accounting (AAA) server over a session management (SM) non-access stratum (NAS) connection between the UE and a session management function (SMF), and over an SM NAS connection between the SMF and the AAA server;
verify that the UE is authorized to establish the PDU session for the logical data network based at least in part on the authentication message exchanges;
receive a key associated with the PDU session based at least in part on the verifying;
generate an authorization token based at least in part on the received key and the network slice information; and
transmit a session response message comprising the generated authorization token to the UE.

25. The apparatus of claim 24, wherein the instructions to receive the key are further executable by the processor to receive an SMF key from a security anchor function (SEAF), wherein the SEAF is a network function maintaining an authentication anchor key derived based at least in part on a successful authentication of the UE to a network.

26. The apparatus of claim 25, wherein the instructions are further executable by the processor to:
receive the SMF key, wherein the SMF key is derived based at least in part on a SEAF key associated with the SEAF; and
integrity protect the session response message based at least in part on the SMF key.

27. The apparatus of claim 24, wherein the instructions to receive the key are further executable by the processor to receive the key from the third-party AAA server based at least in part on an extensible authentication protocol (EAP).

28. An apparatus for wireless communication, in a system comprising:
a processor;
memory in electronic communication with the processor; and
instructions stored in the memory and operable, when executed by the processor, to cause the apparatus to:
transmit a session request message to establish a protocol data unit (PDU) session for a logical data network comprising one or more network slices, the session request message comprising session parameters including network slice information associated with the one or more network slices;
receive a session management (SM) non-access stratum (NAS) security mode command, wherein the SM NAS security mode command comprises one or more of a selected security algorithm or a session policy for the PDU session;

verify the SM NAS security mode command based at least in part on the session request message;

transmit an SM NAS security mode complete message based at least in part on verifying the SM NAS security mode command; and receive a session response message comprising an authorization token that is based at least in part on a session management function (SMF) key and the network slice information.

29. The apparatus of claim 28, wherein the instructions are further executable by the processor to:

integrity protect the session request message based at least in part on the SMF key derived from an authentication anchor key maintained by a security anchor function (SEAF).

* * * * *